United States Patent
Malvar

(10) Patent No.: US 6,990,242 B2
(45) Date of Patent: *Jan. 24, 2006

(54) ADAPTIVE ENCODING AND DECODING OF BI-LEVEL IMAGES

(75) Inventor: Henrique S. Malvar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 67 days.

This patent is subject to a terminal disclaimer.

(21) Appl. No.: 10/988,089

(22) Filed: Nov. 12, 2004

(65) Prior Publication Data

US 2005/0089233 A1 Apr. 28, 2005

Related U.S. Application Data

(63) Continuation of application No. 09/815,943, filed on Mar. 23, 2001, now Pat. No. 6,832,005.

(51) Int. Cl.
*G06K 9/36* (2006.01)

(52) U.S. Cl. .................................... 382/238

(58) Field of Classification Search ............... 382/232, 382/233, 236, 238, 244–247; 348/384.1, 348/394.1, 411.1, 412.1, 415.1, 417.1, 418.1, 348/422.1, 425.2; 358/426.01, 426.09, 426.13; 375/240.12, 240.27; 341/65, 94

See application file for complete search history.

(56) References Cited

U.S. PATENT DOCUMENTS

| | | | | |
|---|---|---|---|---|
| 5,960,116 A | * | 9/1999 | Kajiwara | 382/238 |
| 6,549,676 B1 | * | 4/2003 | Nakayama et al. | 382/246 |
| 6,560,365 B1 | * | 5/2003 | Nakayama et al. | 382/233 |

* cited by examiner

*Primary Examiner*—Jose L. Couso
(74) *Attorney, Agent, or Firm*—Lyon & Harr, LLP; Richard T. Lyon

(57) ABSTRACT

A system and process for encoding and later decoding of bi-level images that does not use arithmetic coding, but whose performance is close to that of state-of-the-art coders such as JBIG, JBIG-2, and JB2. In general, the present bi-level coder (BLC) uses two context-based adaptive modules: 1) an adaptive predictor controlled by low-resolution probability estimates that is used to map the original pixels explicitly into prediction error pixels, and 2) a backward-adaptive Run-Length-Rice (RLR) coder that encodes the prediction error pixels. That's contrary to the usual approach where the context-dependent probability estimate controls both pixel prediction and adaptive entropy coding. Due to its simplicity, in many applications BLC may be a better choice other current coders.

20 Claims, 16 Drawing Sheets

| Image | | | | | |
|---|---|---|---|---|---|
| Dimensions | 1728 x 2339 | 1728 x 2339 | 1728 x 2339 | 1728 x 2339 | 1728 x 2339 |
| G3 | 33,450 | 33,380 | 58,384 | 96,106 | 60,956 |
| G4 | 17,994 | 11,364 | 26,860 | 67,664 | 30,970 |
| BLC | 12,943 | 8,081 | 19,964 | 48,722 | 23,224 |
| JBIG | 12,732 | 8,140 | 19,982 | 48,171 | 23,442 |
| JBIG-2 | 12,858 | 7,882 | 19,404 | 46,321 | 22,569 |
| JB2 (DjVu) | 9,606 | 8,697 | 16,820 | 29,480 | 18,230 |
| Image | | | | | Total |
| Dimensions | 1728 x 2339 | 1728 x 2339 | 1728 x 2339 | 1728 x 2336 | |
| G3 | 49,074 | 103,164 | 61,732 | 151,102 | 647,348 |
| G4 | 16,706 | 71,674 | 19,004 | 138,146 | 400,382 |
| BLC | 11,913 | 52,683 | 13,386 | 61,183 | 252,099 |
| JBIG | 11,771 | 52,106 | 13,993 | 63,886 | 254,223 |
| JBIG-2 | 11,680 | 50,958 | 12,850 | 51,531 | 236,053 |
| JB2 (DjVu) | 13,011 | 38,295 | 14,504 | 58,624 | 207,267 |

FIG. 8

| Image |  |  |  | | Total |
|---|---|---|---|---|---|
| Dimensions | 1176x1552 | 1164x1548 | 1140x1544 | 1192x1540 | |
| G3 | 47,290 | 11,884 | 48,390 | 18,250 | 125,814 |
| G4 | 26,182 | 4,444 | 26,714 | 9,776 | 67,116 |
| BLC | 19,746 | 3,335 | 20,477 | 7,420 | 50,978 |
| JBIG | 21,221 | 3,754 | 21,694 | 7,774 | 54,443 |
| JBIG-2 | 19,744 | 3,584 | 20,497 | 7,628 | 51,453 |
| JB2 (DjVu) | 24,793 | 3,751 | 25,291 | 8,219 | 62,054 |

ADAPTIVE ENCODING AND DECODING OF BI-LEVEL IMAGES

CROSS-REFERENCE TO RELATED APPLICATIONS:

This application is a continuation of a prior application entitled "ADAPTIVE ENCODING AND DECODING OF BI-LEVEL IMAGES" which was assigned Ser. No.09/815,943 and filed Mar. 23, 2001 now U.S. Pat. No. 6,832,005.

BACKGROUND

1. Technical Field

The invention is related to the encoding and subsequent decoding of bi-level images, and more particularly to a system and process for encoding and decoding bi-level images that uses two context-based adaptive modules: 1) an adaptive predictor controlled by low-resolution probability estimates that is used to map the original pixels explicitly into prediction error pixels, and 2) a backward-adaptive Run-Length-Rice (RLR) coder that encodes the prediction error pixels.

2. Background Art

Bi-level images are quite common in digital document processing, because they offer the potential for a compact representation of black-and-white documents containing texts and drawings. In such images, their picture elements (pixels) can be seen as coming from a binary source (e.g., white="0" and black="1"). Since they usually contain a lot of white space and repeated ink patterns, one basic approach to efficiently encode such images is to scan them in raster order, e.g., from top to bottom and left to right, and encode each pixel via adaptive arithmetic coding (AC), whose state (or probability table) is controlled by a context formed by the values of the pixels in a small template enclosing previously encoded pixels [1]. That idea is the basis of most modern bi-level image compression systems.

Facsimile images are usually transmitted using the old CCITT standards T.4 and T.6, which are usually referred to as Group 3 and Group 4 respectively. G3 usually encodes images with a modified Huffman (MH) code (i.e., Huffman coding on runs of black or white pixels), and G4 uses MMR coding. MH and MMR are not as efficient as context-adaptive AC, but are simpler to implement. Over time, G3 and G4 evolved to include encoding via JBIG (also known as recommendation T.82). JBIG uses the context-adaptive AC, with adaptive templates and the efficient QM binary arithmetic encoder [2]. The JBIG-2 standard extends JBIG by including pattern matching for text and halftone data, as well as soft pattern matching (SPM) [3] for lossy encoding. The JB2 encoder [4] is also based on SPM, but uses the Z-coder for binary encoding. JBIG, JBIG-2 and JB2 can provide a significant improvement in compression performance over G4.

Although arithmetic coding is usually the choice when high compression performance is desired, comparable performance can be achieved by appropriate refinements to run-length (RL) coders. The Z-coder and the adaptive TRL coder are examples of efficient RL variants.

It is noted that in this background section and in the remainder of the specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The present invention is directed at a new bi-level image encoding and decoding system and process that does not use arithmetic coding, but whose performance is close to that of state-of-the-art coders such as JBIG, JBIG-2, and JB2. In general, the present bi-level coder (BLC) uses two context-based adaptive modules: 1) an adaptive predictor controlled by low-resolution probability estimates that is used to map the original pixels explicitly into prediction error pixels, and 2) a backward-adaptive Run-Length-Rice (RLR) coder that encodes the prediction error pixels. That's contrary to the usual approach where the context-dependent probability estimate controls both pixel prediction and adaptive entropy coding. Due to its simplicity, in many applications BLC may be a better choice other current coders.

The bi-level image compression encoding begins with a pixel prediction and prediction error generation procedure. Pixel prediction generally entails predicting the value of a pixel (e.g., either 0 or 1) based on surrounding pixels. More particularly, pixel prediction is accomplished by computing context-dependent probability estimates. A context is essentially a neighborhood of previously encoded pixels forming a pattern referred to as a template. Any standard template can be adopted for the purposes of the present invention. The context can be viewed as vector list of a prescribed number of pixel values in raster order. These values form a binary word that uniquely identifies the context. This binary word is referred to as a context index.

The context-dependent probability estimates are computed by first creating and initializing a pixel probability table. This is accomplished by assigning an initial probability to each of the possible context indexes. Preferably, the initial probability would be 0.5 (i.e., an equal possibility that the pixel associated with the context index is black or white). The probability value is however scaled to prevent any round-off problems between the encoder and decoder. Preferably, the scaling is done by choosing an integer number representing a probability of 100% that a pixel is white. For example, in tested embodiments of the present invention the number "8" was employed. Thus, the scaled probability representing the aforementioned initial value would be "4".

For each pixel in raster order, the context index associated with the pattern of previously encoded pixels is identified and the scaled probability read from the table. If the probability is 0.5 or above (i.e., a scaled probability of 4 or above in the example given above), then the pixel under consideration is predicted to be white and assigned the appropriate binary value (e.g., preferably a "0" pixel value). Note that the first time each context index is encountered, the prediction will always be a white pixel since a scaled probability of 4 was initially assigned to each context index in the table. The scaled prediction value is then adjusted by increasing it by a prescribed amount (e.g., by one) if the pixel just predicted was deemed to be white, or decreasing it by a prescribed amount (e.g., by one) if the pixel was predicted to be black. The results of the scaled probability adjustment operation are truncated to a zero value if it falls below zero, and to the maximum scaled probability value minus one if it falls above that value. Thus, the probabilities will vary depending on the image being encoded and what pixel location is being predicted. This is referred to as backward adaptive pixel prediction, since the decoder can perform the same adjustments to the probability estimates without the need for explicit context probability information to be sent to the decoder.

The prediction error is computed next. Essentially, the prediction error is computed by comparing the predicted pixel value of either black or white for each pixel in the bi-level image to the actual pixel. Then, only data concerning those predictions that are incorrect need be transmitted. In most cases, the prediction will be correct, so a considerable savings in the amount of data can be realized. This works because as will be described later, the decoder performs the same prediction process and will get the same results including the errors. Thus, all the decoder needs to know is which of the predicted pixel values are in error so they can be changed from white to black or black to white, as the case may be, to reconstruct the image. The prediction error is specifically computed using a binary technique such that the actual value of each pixel in the image is compared to its predicted value using exclusive OR logic. Thus, if the actual pixel value matches the predicted value (e.g., both are 0's or both are 1's), then a "0" is assigned to that pixel location as part of a so-called prediction error image. However, if the actual pixel value is different from the predicted value, then a "1" is assigned to the associated pixel location in the prediction error image.

The next phase of the bi-level image encoding involves the use of a context-dependent, backward-adaptive, Run-Length-Rice (RLR) coding procedure. As it has been found that the predicted value will usually match the actual value, the prediction error image is composed mostly of 0's. This makes the prediction error image particularly amenable to further compression, thus allowing even less information to be transmitted. To encode the prediction error image, it is preferred the RLR encoding technique be used. In general a RLR coder is a variable-to-variable length entropy coder in which uninterrupted runs of $2^k$ zeros are represented by a codeword formed by a single "0", and partial runs of r zeros ($r<2^k$) followed by a 1 are represented by a codeword formed by a 1 followed by the k-bit binary word representation of r. The variable k defines the maximum run length of zeros that can occur in the prediction error image before a codeword is transmitted. Adjusting this variable controls the efficiency of the coding operation. The preferred technique is to employ a backwards-adaptive approach for adjusting k. This approach involves choosing an initial value for k and then adjusting it up or down in increments based on whether a "0" codeword is generated or a "1+k-bit binary word" code is generated. The RLR encoding technique according to the present invention is also made dependent on the previously described contexts. Specifically, an encoding table is established which assigns a k variable to each context index. The encoding table is updated to reflect the changes to the k values that may occur during the encoding of the bi-level image, as will be explained next.

The aforementioned context-dependent, backward adaptive, RLR encoding technique involves first initializing the aforementioned encoding table by setting the k value associated with each context index to a prescribed initial value (e.g., k=2). In addition, a scaled version of the k variable designated as the Rice parameter k' is assigned to each context. For example, a simple scaling factor could be multiplied by the current k value to produce the current k' value, which would be greater than the k value.

When a prediction error value is established for a pixel location, the present RLR coder identifies the context index associated with that pixel location as determined in the prediction error determination process described earlier. The k value currently assigned to that context index is then read from the encoding table. In the case where the pixel location under consideration is the first pixel in raster order in the image (i.e., the upper left hand corner pixel), the associated k value read from the table is used to calculate the run length, where the run length is preferably equal to $2^k$. This run length represents the number of consecutive white pixels in raster order that must exist in order to generate a "0" codeword. When the next prediction error value is computed, it is determined whether it is a "1" or a "0". If it is a "0", then it is determined if this value is in the "middle" of the previously computed run length under consideration or whether it represents the end of this run length. If it does not represent the end of a run, no codeword is generated. If, however, the prediction error value does represent the end of a run, then a "0" codeword is transmitted. Of course in order to know whether an prediction error value represents the end of the current run length, the present RLR coder must keep track of how many "0" have been encountered. This is preferably done by also including run counters in the encoding table. Specifically, a separate run counter would be assigned to each context index. In one embodiment the run counter would initially be set to the computed run length value. Then, each time a "0" is encountered as discussed above, including the first in the series, the counter is decremented by one. When the counter reaches zero, the prediction error value currently being process is deemed to be the end of the current run length. If, on the other hand, a prediction error value of "1" is encounter at any time during a run, then the present RLR coder generates a "1+k-bit binary word" code where the k-bit binary word represents the number of "0's" encountered in the current run prior to encountering the "1". The number of "0's" encountered can be easily determined using the aforementioned run counter assigned to the context index associated with the pixel location where the run began. Once a codeword has been generated, whether it is a "0" or a "1+k-bit binary word", the very next prediction error value that is generated is used to start another run. This is accomplished as it was for the first pixel location by identifying the context index associated with the pixel location of the prediction error value and repeating the foregoing process.

In addition, every time a codeword is generated, the k-value associated with the run that resulted in the codeword is adjusted. This is preferably accomplished as follows. If the codeword generated was a "0", then the parameter k' is increased by a prescribed amount. Conversely, if the codeword was not a "0", then the parameter k' is decreased by a prescribed amount. This prescribed amount can vary, if desired, depending on the current value of k'. The new k value is computed by dividing the new k' value by the aforementioned scaling factor. The new value for k' is then stored in the encoding table in place of the previous value. By adjusting k' by integer steps, it is possible to achieve a fine adjustment of the RLR parameter k, which is necessary for optimal encoding performance, while keeping only integer arithmetic, which is necessary to allow the decoder to precisely track the k adjustment steps.

The process for decoding a bi-level image encoded as described above is for the most part just the reverse of the coding process. Specifically, the decoding process first involves receiving the bitstream generated by the encoder and processing it using what will be referred to as a context-dependent, backward-adaptive, Run-Length-Rice (RLR) decoding technique. The present RLR decoder processes each codeword in the incoming bitstream in the order of its arrival. Essentially, if the received codeword is of the "1+k-bit binary word" form, the decoder assigns the designated number of 0's to each consecutive pixel location of a prediction error "image", in raster order, beginning with the first pixel location (e.g., the upper left hand corner pixel location) if the codeword is the first codeword received, or beginning just after the last assigned location for any successive codeword. It then assigns a "1" to the next consecutive pixel location. However, if a "0" codeword is received, the coder preferably assigns a $2^k$ number of 0's, each to respective consecutive pixel locations of the image, in raster order, beginning with the first pixel location if the codeword is the first codeword received or beginning just after the last assigned location for any successive codeword. Of course, while the number of 0s designated by the binary word is straight forward, the decoder must know what the value of k in order to designate the correct number of 0s when a "0" codeword is received. Essentially, to accomplish this task it is first recognized that the prediction error value of the first pixel location will always be a 0 as a result of the encoding process. Thus, the decoder assigns a 0 to that location and sends the value to an integrator. At the same time, the decoder starts the same pixel prediction process as was used by the encoder. Specifically, as the predicted value of the first pixel location will always be white (e.g., a 0), the decoder predicts this pixel to be a 0 and send it to the integrator as well. The integrator is simply an exclusive OR process. Thus, if the retrieved prediction error value is a 0 (i.e., no error) and the predicted pixel value generated by the decoder is a 0, then the result is a 0 which is designated as the actual pixel value and assigned to the pixel location under consideration. Likewise if the predicted error value is a 0 and the predicted pixel value is a 1, a 1 is generated and assigned to the pixel location. If, however, the recovered prediction error is a 1, the predicted pixel value generated by the decoder is flipped such that a 0 is changed to a 1 and 1 is changed to a 0. These flipped values are then designated as the actual pixel value of the pixel location under consideration.

Once the first prediction error value and first predicted pixel value have been processed (which will always produce a 0 or white pixel in the recovered bi-level image), the process continues as follows. In association with generating the first predicted pixel value, the decoder also identifies the context associated with the pixel location. In the case of the first pixel location this context will always be all 0's and so the context index would also be a 0. The RLR decoder constructs a decoding table that matches the previously discussed encoding table. Namely, an initial k value (if included) is assigned to each possible context indexes, as is a k' value and a run counter value. These initial values are by design the same as those used to construct the encoding table. The decoder takes the context index provided to it as a result of the pixel prediction process and uses this to identify the appropriate k value. Thus, if the codeword under consideration is a 0, the decoder knows the run length. As such the decoder simply assigns 0's to the appropriate number of consecutive pixel locations that form the prediction error image. In the case of the first pixel location, if the first code word is a 0, a number of consecutive pixel locations based on the initial value of k and starting with the first location would be assigned a 0. In addition, the k value associated with the context index of the pixel location at the beginning of the run length is adjusted just as it was in the encoding process. Thus, the decoding table will always match the encoding table as it existed when the codeword currently being processed was generated. As the prediction error values are generated in the above manner, they are fed to the integrator, which is also receiving the predicted pixel values for the associated pixel locations that continue to be generated using the same method as was used to generated them in the encoding process. This is possible because each consecutive actual pixel value reconstructed is made available to the process, and the process uses the same pixel probability table scheme as the encoder.

Once the first incoming codeword has been processed as above, the decoder retrieves the next received codeword and processes it in the same way, except that the context employed is that associated with the next consecutive un-reconstructed pixel location in the bi-level image being generated (which corresponds to the next un-assigned pixel in the so-called prediction error image being generated by the decoder). This is repeated over and over until the entire image has been reconstructed.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIG. 8 is a table showing the compression performance of several bi-level lossless coders including that of the present invention on the CCITT image set at 200 dpi.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
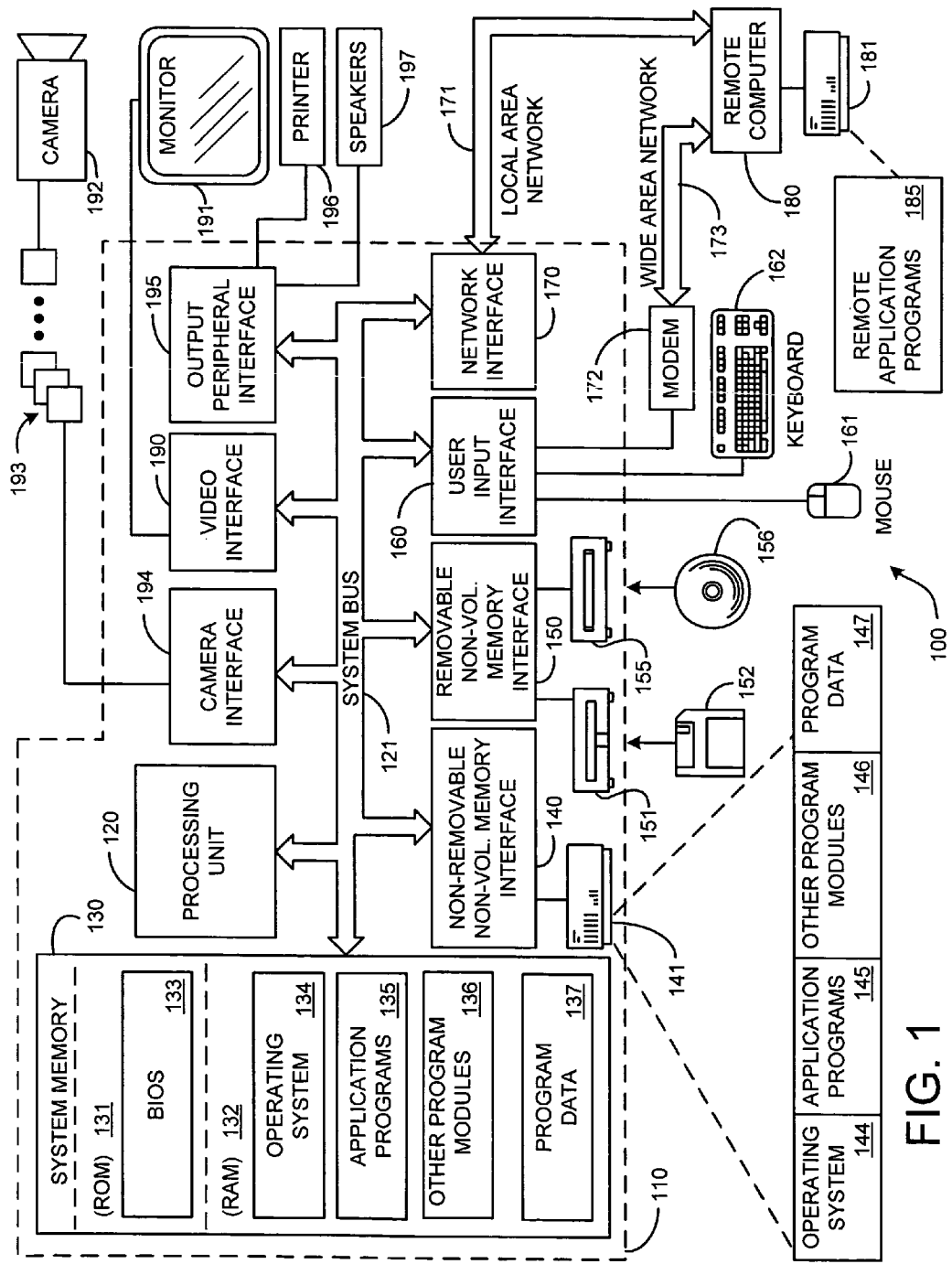
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2A:
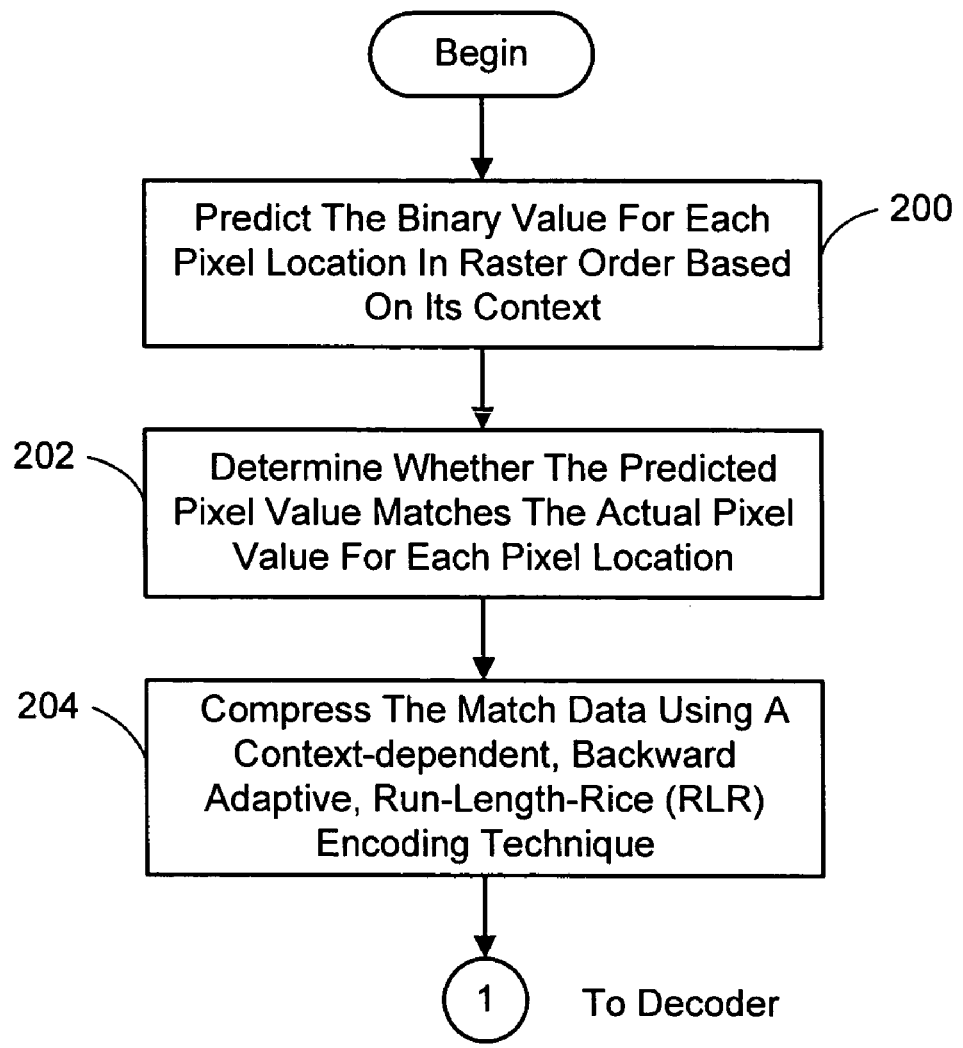
FIGS. 2A–B depict a flow chart diagramming an overall process for encoding and decoding bi-level images in accordance with the present invention.

The exemplary operating environment having now been discussed, the remaining part of this description section will be devoted to a description of the program modules embodying the invention. The system and process according to the present invention involves encoding and decoding bi-level images. In general, encoding of a bi-level image is accomplished via the following process actions, as shown in the high-level flow diagram of FIG. 2A:

a) predict a binary value for each pixel location in the bi-level image in raster order based on its context (process action 200);

b) determine whether the predicted pixel value matches the actual pixel value for each pixel location (process action 202); and c) compress the data concerning at which pixel locations the predicted pixel values match and do not match the actual values using a context-dependent, backward adaptive, Run-Length-Rice (RLR) encoding technique (process action 204).

Figure 2B:
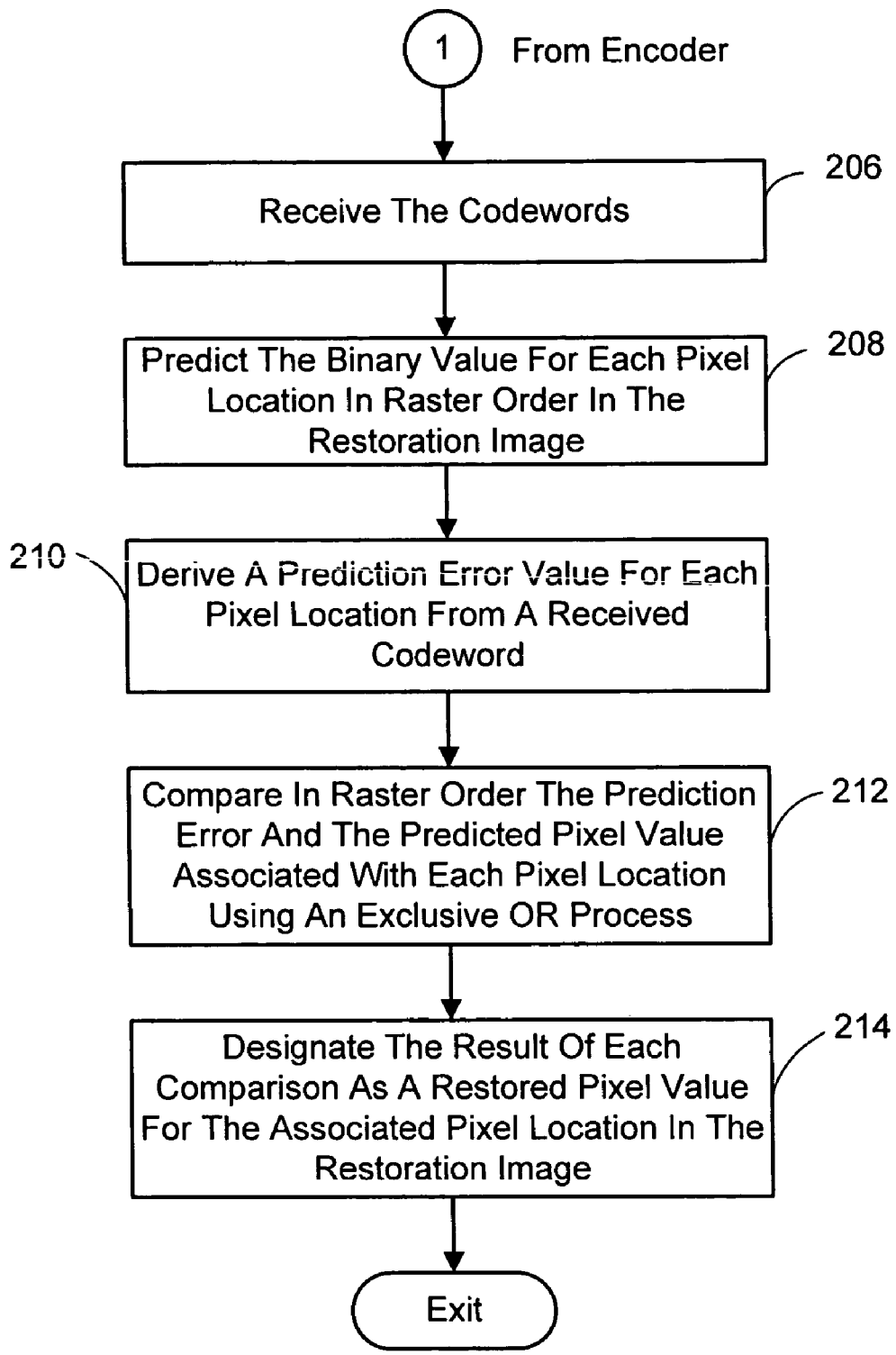

As will be described in detail below, the aforementioned RLR encoding technique results in a series of codewords that are decodable to restore the original bi-level image. For example, the codewords could be transmitted over a network to a receiver that has been configured to perform the decoding process. Specifically, the codewords are used to derive prediction error values indicating whether the pixel values of each pixel location in the bi-level image had a first binary value or a second binary value. As such, decoding of a bi-level image encoded by the foregoing process is generally accomplished via the following process actions, as shown in the high-level flow diagram of FIG. 2B:

a) receive the series of codewords (process action 206);

b) predict a binary value for each pixel location in raster order in a restoration image of the encoded bi-level image based on its context (process action 208);

c) derive a prediction error value for each pixel location from a received codeword (process action 210);

d) compare in raster order the prediction error assigned to a pixel location of the restoration image and the predicted pixel value for that location using an exclusive OR process such that whenever the prediction error value is the first binary value the corresponding predicted pixel value is not changed, and whenever the prediction error value is the second binary value the corresponding predicted pixel value is flipped to its opposite binary value (process action 212); and e) designate the result of each prediction error and predicted pixel value comparison as a restored pixel value for the associated pixel location in the restoration image (process action 214).

The following section will now described the foregoing bi-level image encoding and decoding process in detail.

1.0 Pixel Prediction and Prediction Error

An efficient way to exploit the redundancy in bi-level images is to build a context. A context is essentially a particular pattern of black and white pixels in a neighborhood of previously encoded pixels. As the pixels are preferably encoded in raster order, the neighborhood of previously encoded pixels will form a pattern of pixels preceding the pixel whose value is to be predicted. The set of locations on which to measure the pattern is typically referred to as a template. The context can be viewed as a vector list of a prescribed number of pixel values. As the elements of the list are typically 1's and 0's, it forms a binary word. This binary word is used to identify the context it represents and is referred to as a context index. While any pattern of neighboring, previously predicted pixels could be used, the template shown in Table 1 is preferred and was adopted for the purposes of the present invention.

TABLE 1

|     |   |   |   |   |   |   |              |
|-----|---|---|---|---|---|---|--------------|
| ... |   |   | x | x | x |   | scan line n − 2 |
| ... |   | x | x | x | x | x | scan line n − 1 |
| ... | x | x | x | o |   |   | scan line n     |

In Table 1, the pattern of previously predicted pixels is designated by the "x"s and the current pixel being encoded is marked with an "o". Thus, the values of each of the L neighboring pixels of the template form an L-bit context index, where L=11 in the example template of Table 1. Of course, the use of a standard template for pixels in the corners and along the edge of the bi-level image presents difficulties. In order to handle such situations, any pixel locations in the selected template that fall outside the image, such as would be the case with pixels being predicted that lie in the corners and near the edges of the image, are deemed to be white and assigned the appropriate value (e.g., 0). In that way, the topmost-leftmost pixel always has a context index c equal to 0. Each of the aforementioned contexts exhibits a different pattern of 0's and 1's and so is identified by a different context index. It is noted that since the number of pixel values making up each context is fixed, so are the number of possible context indexes.

Figure 3:
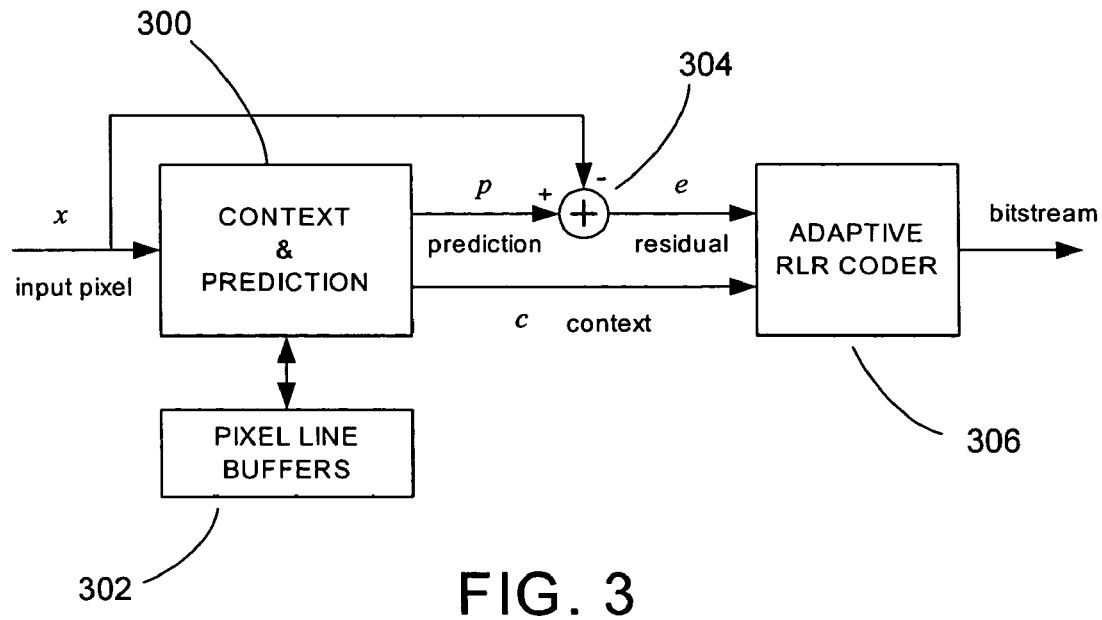
FIG. 3 is a simplified block diagram of the modules for implementing the encoding process of FIG. 2A, which include a context-based prediction module and a context-based entropy coding module.

The probability of a pixel having a value zero, $P_Z$, is estimated independently for each context. Thus, a simple encoding scheme is to raster-scan the pixels in the image from top to bottom and left to right. For each pixel, the L-bit context index c is computed. $P_Z(c)$ is then used to control the entropy coder that will encode the pixel. In the past, an adaptive binary arithmetic encoder, controlled by $P_Z(c)$, was used to encode the pixels. However, the present bi-level coder (BLC) varies from this standard scheme. Specifically, the probabilities $P_Z(c)$ are not used directly to control the entropy encoding, but are used instead to predict the value of the current pixel, in the obvious way. Namely, for the current pixel x with a context index c, if the current estimate of $P_Z(c)$ is greater than 0.5, it is predicted that the pixel value will be p(c)=0, otherwise it is predicted that p(c)=1. The binary prediction error e(c)=x⊕p(c) (where ⊕ denotes exclusive OR) is therefore more likely to assume the value zero. The prediction error e(c) is then explicitly computed and encoded with a binary encoder designed for sources where the value zero is significantly more likely. A simplified block diagram of the present BLC encoder is shown in FIG. 3. Essentially, the encoder has a context and prediction module 300 that inputs the bi-level value x (i.e., a 0 or 1) of the pixel currently being encoded. In addition, pixel line buffers 302 are accessible by the context and prediction module 300 to input values of pixels from previous raster lines and from pixel preceding the pixel under consideration in the same raster line. The context and prediction module 300 uses the aforementioned inputted data to predict the bi-level value of the pixel currently under consideration. This prediction p is then provided to a exclusive OR module 304, which also has as an input the actual bi-level value x of the pixel as read from the image being encoded. The exclusive OR module 304 compares the aforementioned inputs, as will be described later, and outputs an prediction error value or residual e. The transfer of data between the context and prediction module 300 and the pixel line buffers 302 is two-way, as indicated by the double headed arrow linking the two modules. This is because the context and prediction module 300 also provides the prediction value p of the pixel under consideration to the buffers 302 for storage. As part of the process used by the context and prediction module 300 to compute the prediction value p, a context index c associated with the pixel under consideration is identified. This context index c, as well as the residual e are provided to an adaptive RLR coder module 306. As will be discuss later, the adaptive RLR coder module 306 compresses the residual data for transmission.

Having identified the general modules that make up the present BLC encoder, the process by which they are employed will be now described in the paragraphs to follow. The context and prediction module will be described next, and the adaptive RLR coder module will be described in Section 2.

Figure 4A:
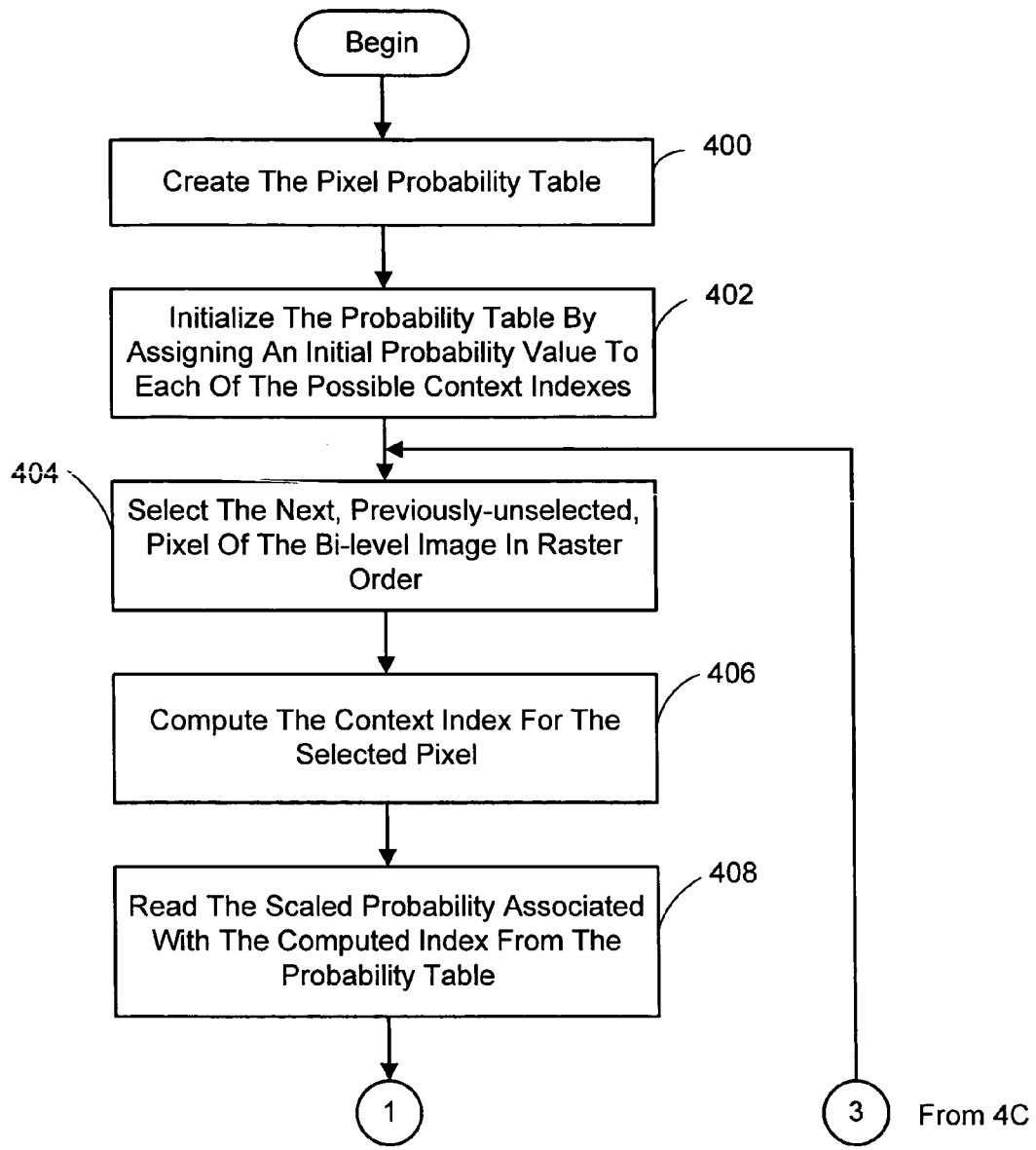
FIGS. 4A–C depict a flow chart diagramming a process for pixel prediction and prediction error generation employed as part of the context and prediction module of FIG. 3.
Figure 4B:
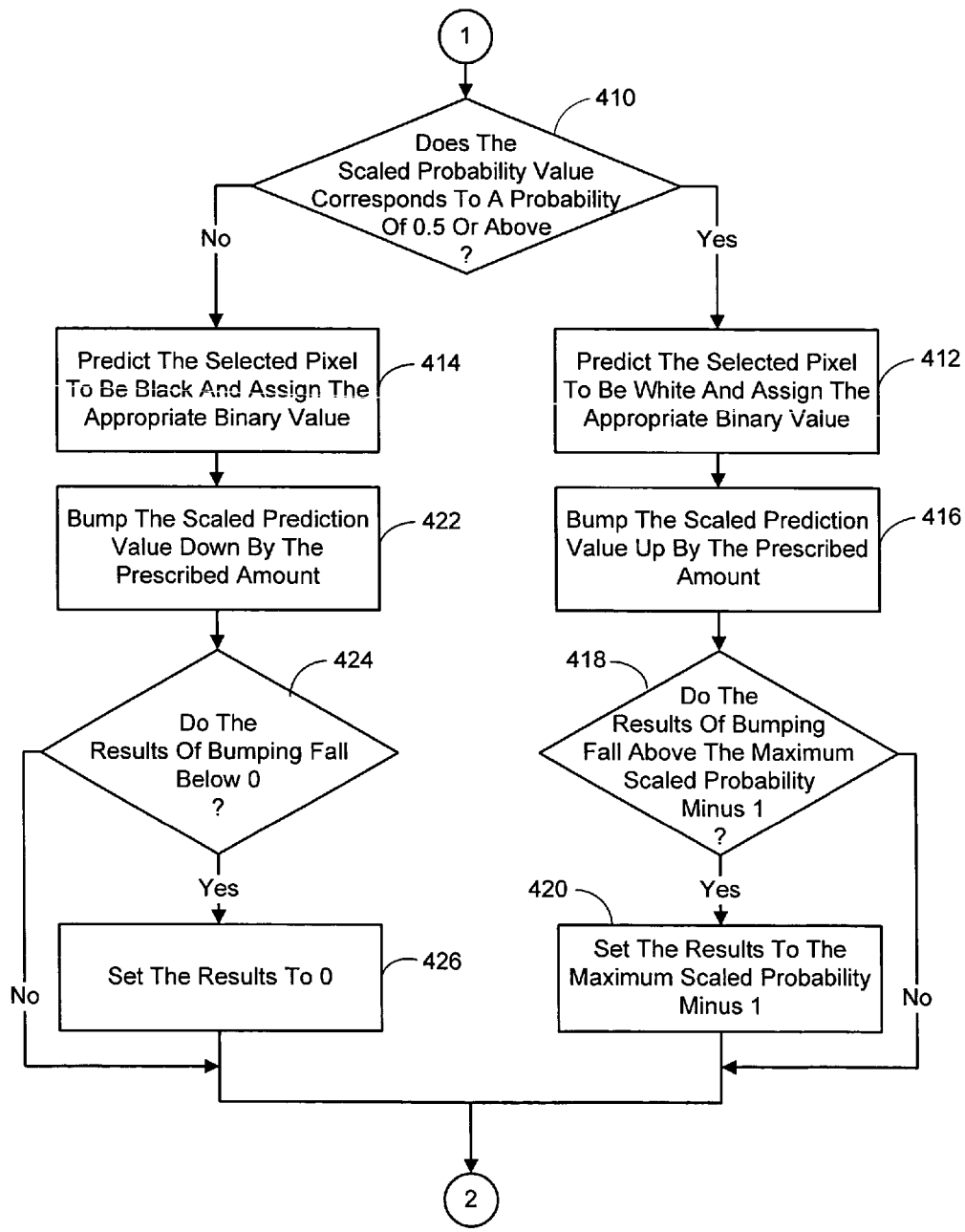
Figure 4C:
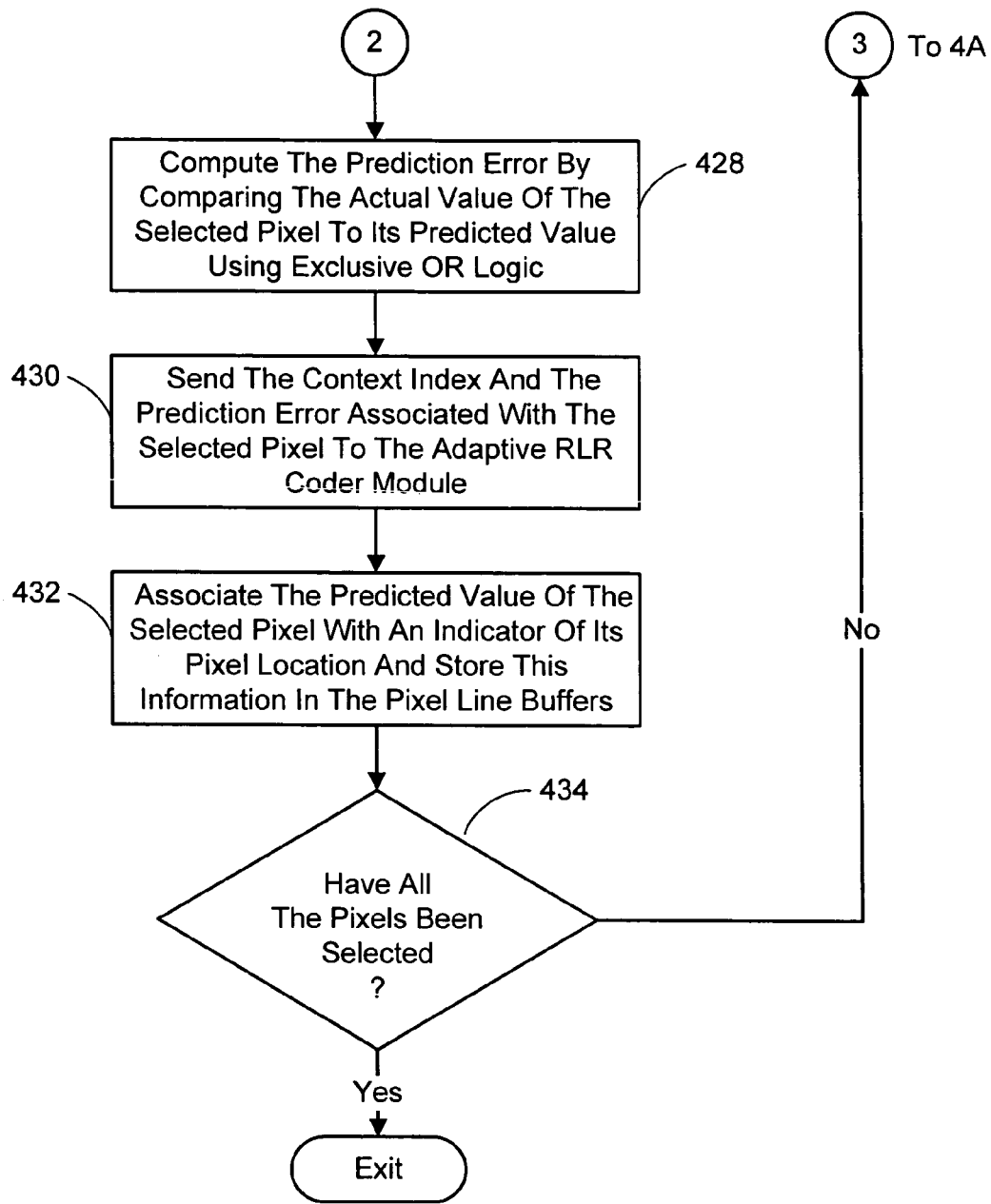

Referring to FIGS. 4A–C, the context-dependent probability estimates are computed by first creating (process action 400) and then initializing a pixel probability table. The initialization of the table is accomplished by assigning an initial probability value to each of the possible context indexes (process action 402). Preferably, the initial probability value corresponds to a probability representing an equal possibility that the pixel associated with the context index is black or white (i.e., a 0.5 probability). The probability value is however a scaled value. This prevents any round-off problems between the encoder and decoder. Preferably, the scaling is done by choosing an integer number representing a probability of 100% that a pixel is white. For example, in tested embodiments of the present invention the number "8" was employed. Thus, the scaled probability representing the aforementioned initial value would be "4". The foregoing initialization is characterized by the following instruction: Initialize $Q_Z(c)=N/2$, for c=0, 1, ..., $2^L-1$, where $Q_Z(c)$ represent scaled probabilities, with $P_Z(c)=(Q_Z(c)-1)/(N-1)$. Thus, for the exemplary choice of N=8, the scaled probability values range from 0 to 7.

Next, the first, previously-unselected, pixel of the bi-level image in raster order is selected (process action 404). In the case of the first pixel this would correspond to the upper leftmost pixel location of the image. The context index c associated with the pattern of previously encoded (or assumed if outside the image) pixels is computed for the selected pixel (process action 406). It is noted that this action will require that previously predicted pixel values falling with in the aforementioned template be identified. This is preferably accomplished by accessing the previously discussed pixel line buffers, which store the values of the pixels in the preceding two raster lines as well as the predicted pixel values of pixel locations preceding the pixel under consideration in the same raster line. Once the context index c is computed, the scaled probability associated with that index is read from the table (process action 408). As explained previously, the L-bit binary representation of c is formed by the values of L previously scanned neighbors of x, in the positions defined by the selected template (such as the one shown in FIG. 2). It is next determined in process action 410 whether the scaled probability value corresponds to a probability of 0.5 or above. If the probability is 0.5 or above (i.e., a scaled probability value of 4 or above in the example given above), then the pixel under consideration is predicted to be white and assigned the appropriate binary value (e.g., preferably a pixel value of 0), as indicated in process action 412. However, if the probability is below 0.5 (i.e., a scaled probability value of less than 4 in the example), then the pixel under consideration is predicted to be black and assigned the appropriate binary value (e.g., preferably a pixel value of 1), as indicated in process action 414. These tasks are characterized by the following instruction: Generate a predictor p(c) for the current pixel by p(c)=0 if $Q_Z(c) \geq N/2$, and p(c)=1 otherwise. Note that the first time each context index is encountered, the prediction will always be a white pixel since a scaled probability of 4 was initially assigned to each context index in the table. Next the scaled probability estimate is adjusted by $Q_Z(c) \leftarrow Q_Z(c)+q$, where q=1 if x=0, and q=−1 if x=1. The resulting $Q_z(c)$ is then truncated to the range [0. . . N−1], i.e. set $Q_Z(c)=0$ if $Q_Z(c)<0$, and $Q_Z(c)=N−1$ if $Q_Z(c)>N−1$. If the pixel just predicted was deemed to be white, the scaled prediction value is adjusted by bumping it up by a prescribed amount (e.g., by one) as indicated by process action 416. Additionally, it is determined if the results of the bumping operation falls above the maximum prescribed scaled probability minus one (process action 418). If so, the results are truncated to that value (process action 420). Alternately, if the pixel was predicted to be black, the scaled prediction value is adjusted by decreased it by a prescribed amount (e.g., by one), as indicated in process action 422. It is then determined in process action 424 whether the results of the bumping operation fall below zero. If so, the results of the bumping operation are truncated to a zero value (process action 426). Thus, the probabilities will vary depending on the image being encoded and what pixel location is being predicted. This is referred to as backward adaptive pixel prediction. Note that the parameter N controls the speed of adaptation in estimating the context-dependent zero probabilities $P_Z(c)$ through its scaled version $Q_Z(c)$. In practice, for a template length L it was found that N= 8 leads to the best results (highest average probability of e=0). Also note that N must be even, to ensure that exactly half of the values of $Q_Z(c)$ lead to p(c)=0 and half lead to p(c)=1. Since $Q_Z(c)$ can only assume values in the range [0. . . N−1], we only need 1092(N) bits per probability entry, i.e. 3 bits for N=8.

The prediction error is computed next. Essentially, the prediction error is computed by first comparing the predicted pixel value of either black or white for each pixel in the bi-level image to the actual pixel. Then, only data concerning those predictions that are wrong need be transmitted. In most cases, the prediction will be correct, so a considerable savings in the amount of data can be realized. This works because as will be described later, the decoder performs the same prediction process and will get the same results including the errors. Thus, all the decoder needs to know is which of the predicted pixel values are in error so they can be changed from white to black or black to white, as the case may be, to reconstruct the image. Referring to FIG. 4C, the prediction error e is specifically computed using a binary technique such that the actual value of each pixel in the image is compared to its predicted value using exclusive OR logic (process action 428), i.e., $e(c)=x \oplus p(c)$ where $\oplus$ refers to the exclusive OR operation. Thus, if the actual pixel value matches the predicted value (e.g., both are 0's or both are 1's), then a 0 is assigned to that pixel location. However, if the actual pixel value is different from the predicted value, then a 1 is assigned to the associated pixel location. Finally, both the context index c and the prediction error e(c) associated with the pixel under consideration are sent to the adaptive RLR coder module for further processing (process action 430), as will be described shortly.

An equivalent interpretation of the prediction steps above is that for each image pixel the probability of zero $P_Z(c)$ is estimated. If the value 1 happens to be more likely, we flip the pixel value to 0; otherwise, we keep it unchanged. The decoder can easily recover x from e, since it can compute the context c based on previous pixels, and thus it knows if the decoded prediction error e needs to be flipped or not to generate the decoded pixel x.

It is further noted that while the predicted pixel values could be computed for all the pixel locations in the bi-level image first, and then the prediction error computed for each, this would require a relatively large amount of memory space since the predicted values would have to be saved for each pixel location. In view of this it is preferred that for each pixel location, the predicted value of the pixel be computed and compared to the actual value before moving on to the next location. In this way, only a small amount of memory space is required—namely just enough to store the predicted pixel values of the pixel locations preceding the pixel under consideration that form the previously described neighborhood. Of course, for practical reasons it may be better to store the entire pixel row involved. Thus, for the preferred neighborhood pattern described previously, the predicted values of the pixel row containing the pixel under consideration and the preceding two rows would be stored in a set of pixel line buffers. Referring to FIG. 4C once again, the foregoing can be summarized by the following action. First, in process action 432, the prediction value p is associated with an indicator of its associated pixel location and stored in the aforementioned pixel line buffers. Then, in process action 434, it is determined if all the pixels of the bi-level image being encoded have been selected. If so, the process ends. However, if unselected pixels remain, then process actions 404 through 434 are repeated until the last pixel is processed.

2.0 Context-Dependent Adaptive Run-Length-Rice Coding

The prediction module described above maps the problem of encoding the original image pixels to that of encoding the prediction errors or residuals, with the associated context information. Even within each context, the statistics of the prediction error will be strongly space-variant within an image. Therefore, in the same way that the zero probabilities are quickly adapted, the entropy encoder for the residuals should also be quickly adaptive.

To encode the prediction error image, it is preferred the RLR encoding technique be used. In general, a RLR coder is a variable-to-variable length entropy coder in which uninterrupted runs of $2^k$ zeros are represented by a codeword formed by a single "0", and partial runs of r zeros ($r<2^k$) followed by a 1 are represented by a codeword formed by a "1" followed by the k-bit binary word representation of r. The variable k defines the maximum run length of zeros that can occur in the prediction error image before a codeword is transmitted. RLR coders are also known as adaptive run-length coders [5], truncated run-length coders [6], and extended Golomb coders [7], and are almost identical to the Melcode in [8]. Although quite simple, RLR coders are close to optimal for a memoryless binary source, as long as k is appropriately chosen for the source probability of zero, which is assumed to be greater than ½ [6]. In fact, an RLR coder is a variable-to-variable length coder formed by the cascade of a Tunstall coder and a Huffman coder.

The RLR coder operates close to the entropy of the source if its run-length parameter k is optimally chosen for the given probability of zero. Thus, adjusting this variable controls the efficiency of the coding operation. For example, if the variable k were too large then fewer "0" codewords would be produced and instead most codewords would be of the "1+k-bit binary word" form. This latter codeword form requires much more data to be transmitted than a simple "0" codeword. Therefore, it is desirable that the variable k not be too large. On the other hand, if the variable k were too small, then multiple "0" codewords would be transmitted where one would do. Thus, the coding scheme is less efficient if the variable k is too small. It should also be recognized that the nature of the bi-level image is not known in advance. In other words, the distribution of black and white pixels will not be known. In addition, the distribution of black and white pixels will likely vary across the image. As a result of this uncertainty, it is difficult to select a single value of the variable k that would efficiently cover all bi-level images. This problem is handled by making the variable adaptive in that it is changed as the image is encoded in an attempt to optimize it for both the overall image and the portion of the image currently being encoded. Since the predictor module described previously estimates $P_Z(c)$ for the image pixels, it is easy to compute the probability of zero for the residual e, $P_{ZE}(c)$, by $$P_{ZE}(c) = \begin{cases} P_Z(c), & \text{if } P_Z(c) \geq 1/2 \\ 1 - P_Z(c), & \text{if } P_Z(c) < 1/2 \end{cases} \quad (1)$$

It would then be possible to use $P_{ZE}(c)$ to control the parameter k of the RLR coder in a forward fashion. That is the idea behind the bi-level coder presented in [6]. In prior art, context probabilities have been used to control the entropy encoding stage, which is usually an arithmetic encoder. However, the present simple "scaled probability" approach could not be used, since it does not provide enough precision in the probability estimate to control k. To increase precision, it would be necessarily to undesirably slow down probability adaptation. Accordingly, the preferred technique is to employ a backward adaptive approach in varying k. This approach involves choosing an initial value for k and then adjusting it up or down in increments based on whether a "0" codeword is generated or a "1+k-bit binary word" code is generated. The RLR encoding technique according to the present invention is also made dependent on the previously described contexts. Specifically, an encoding table is established which assigns a k variable to each context index. The encoding table is updated to reflect the changes to the k values that may occur during the encoding of the bi-level image, as will be explained next. This dual adaptation approach is a clear advantage of the present invention: the context-probability estimates are adjusted in a manner that maximizes performance of the prediction module, whereas the k parameter is adjusted in a manner that maximizes performance of the RLR entropy encoding module. Both adaptations are performed based on encoded data, so that the decoder can track the state of such adaptation without any extra information needed to be sent by the encoder in order to enable such tracking.

Figure 5A:
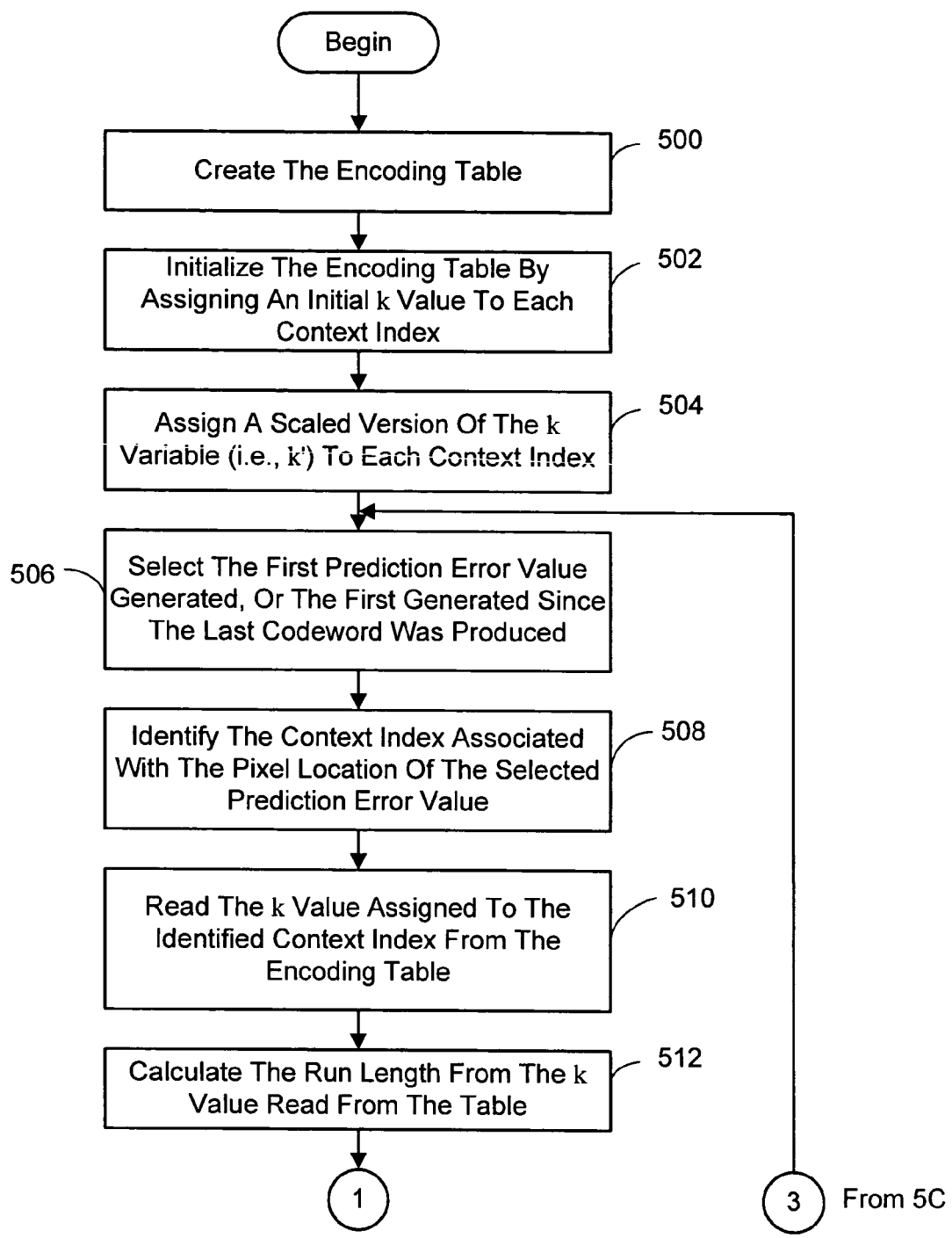
FIGS. 5A–C depict a flow chart diagramming a process for context-dependent adaptive Run-Length-Rice RLR coding employed as part of the Adaptive RLR coder module of FIG. 3.
Figure 5B:
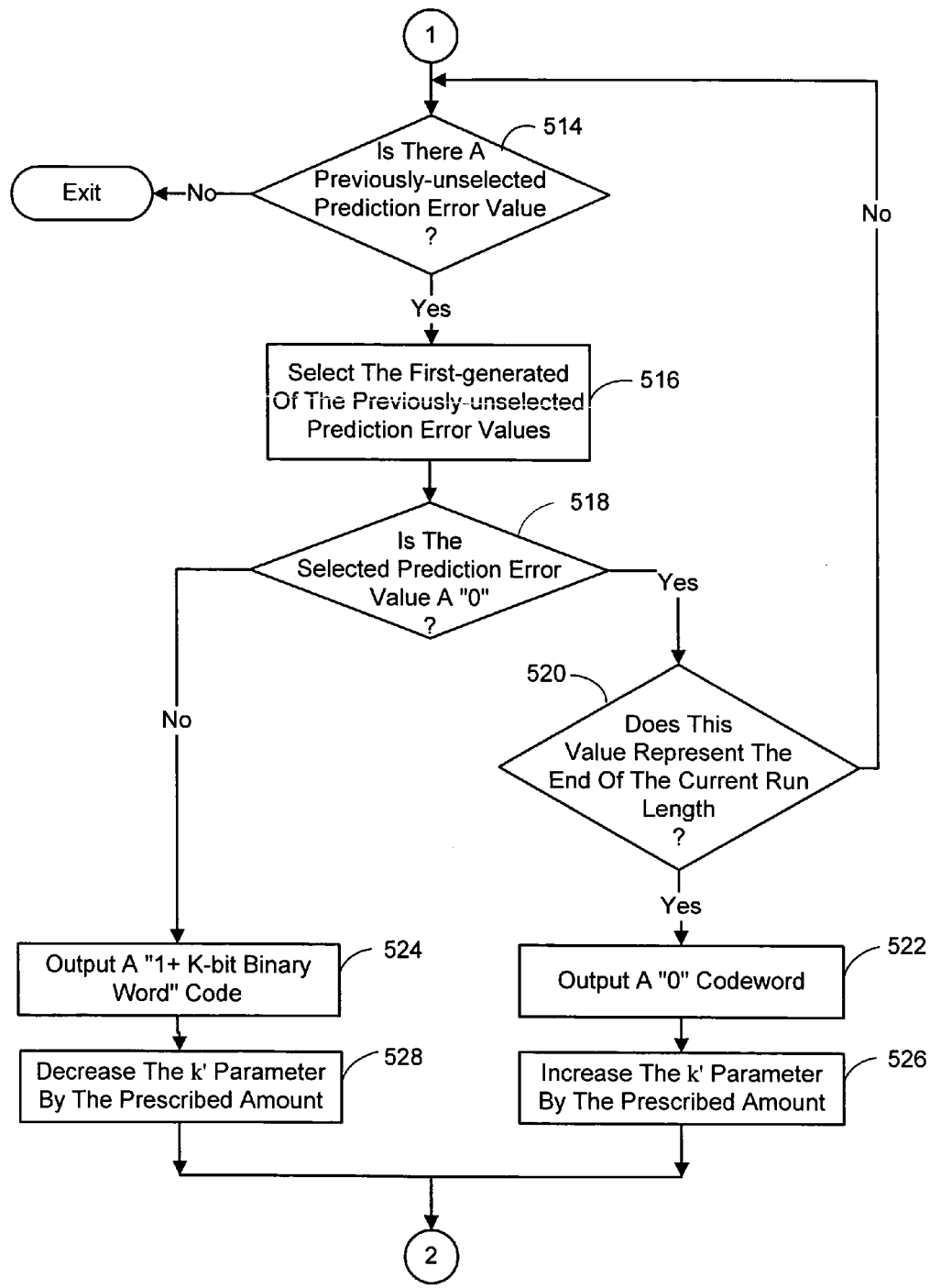
Figure 5C:
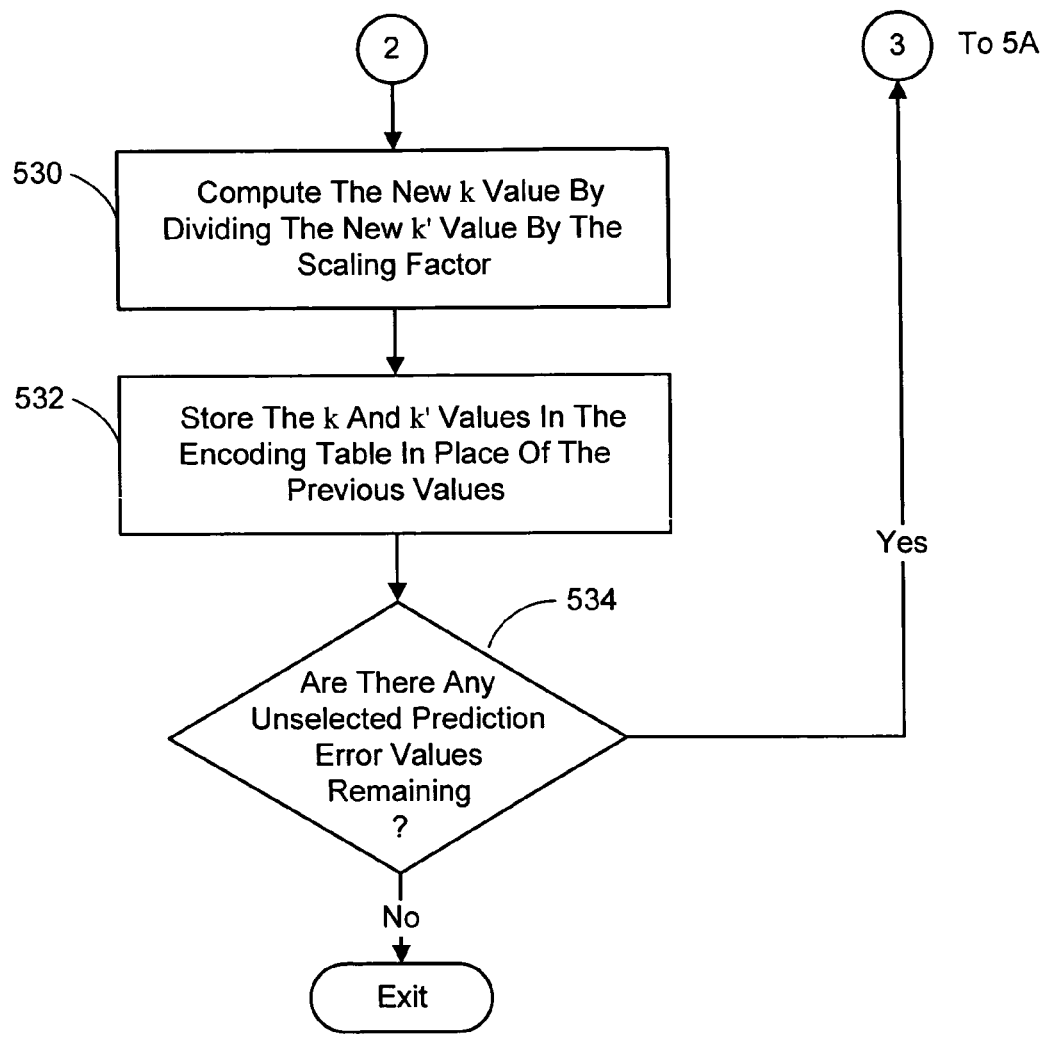
Figure 7A:
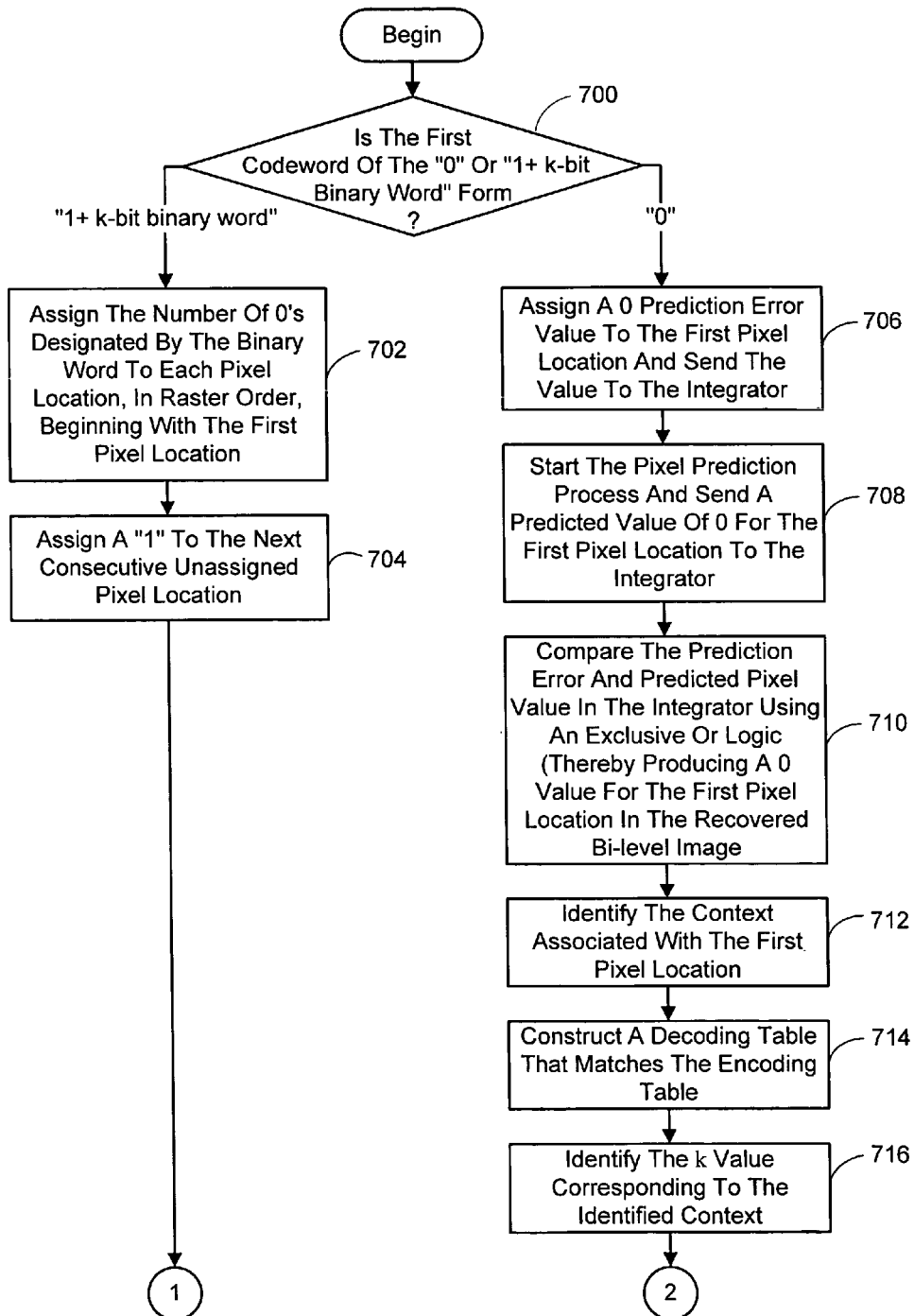
FIGS. 7A–D depict a flow chart diagramming a process for decoding bi-level images encoded using the encoding process of FIG. 2A.
Figure 7B:
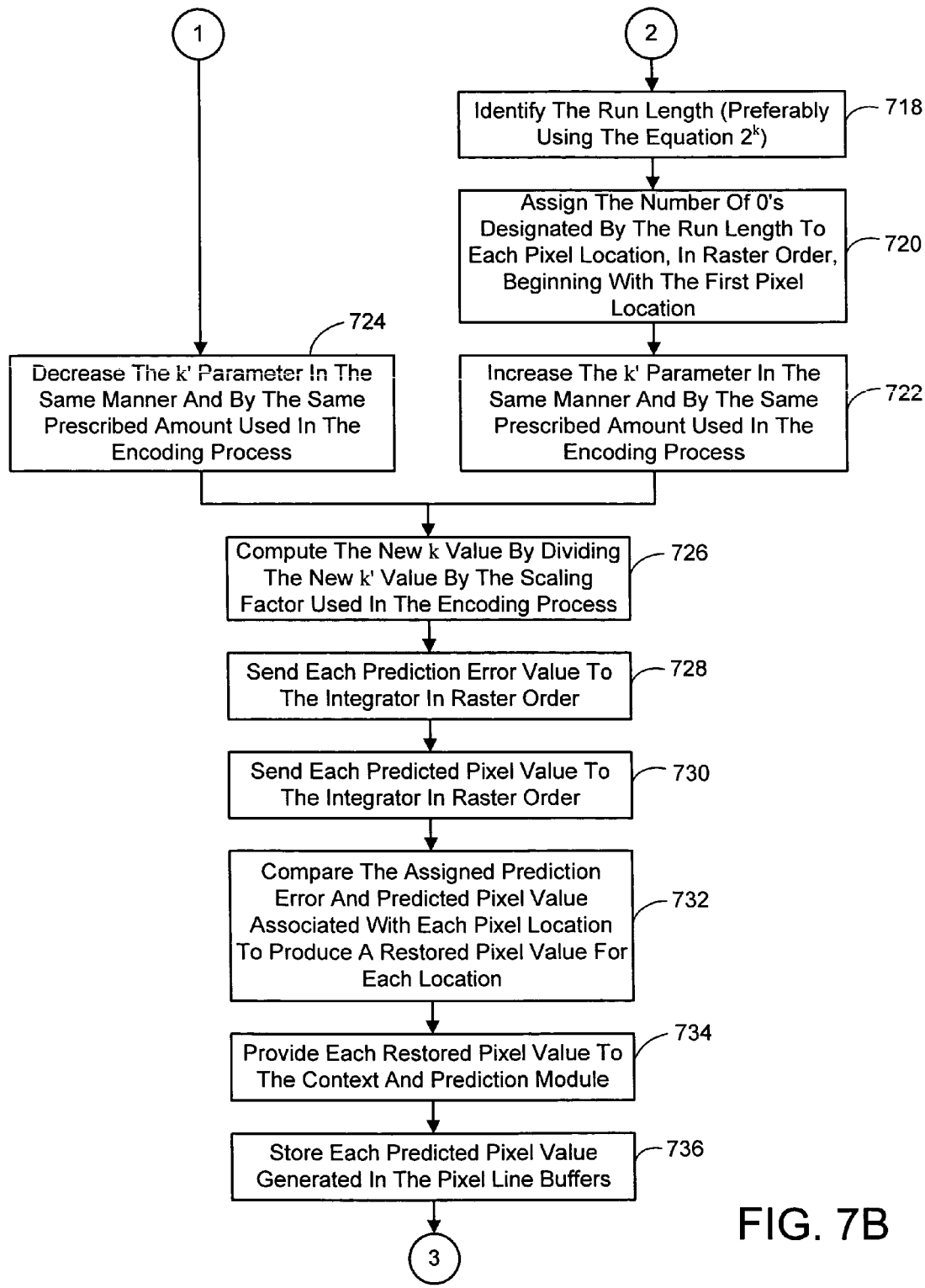
Figure 7C:
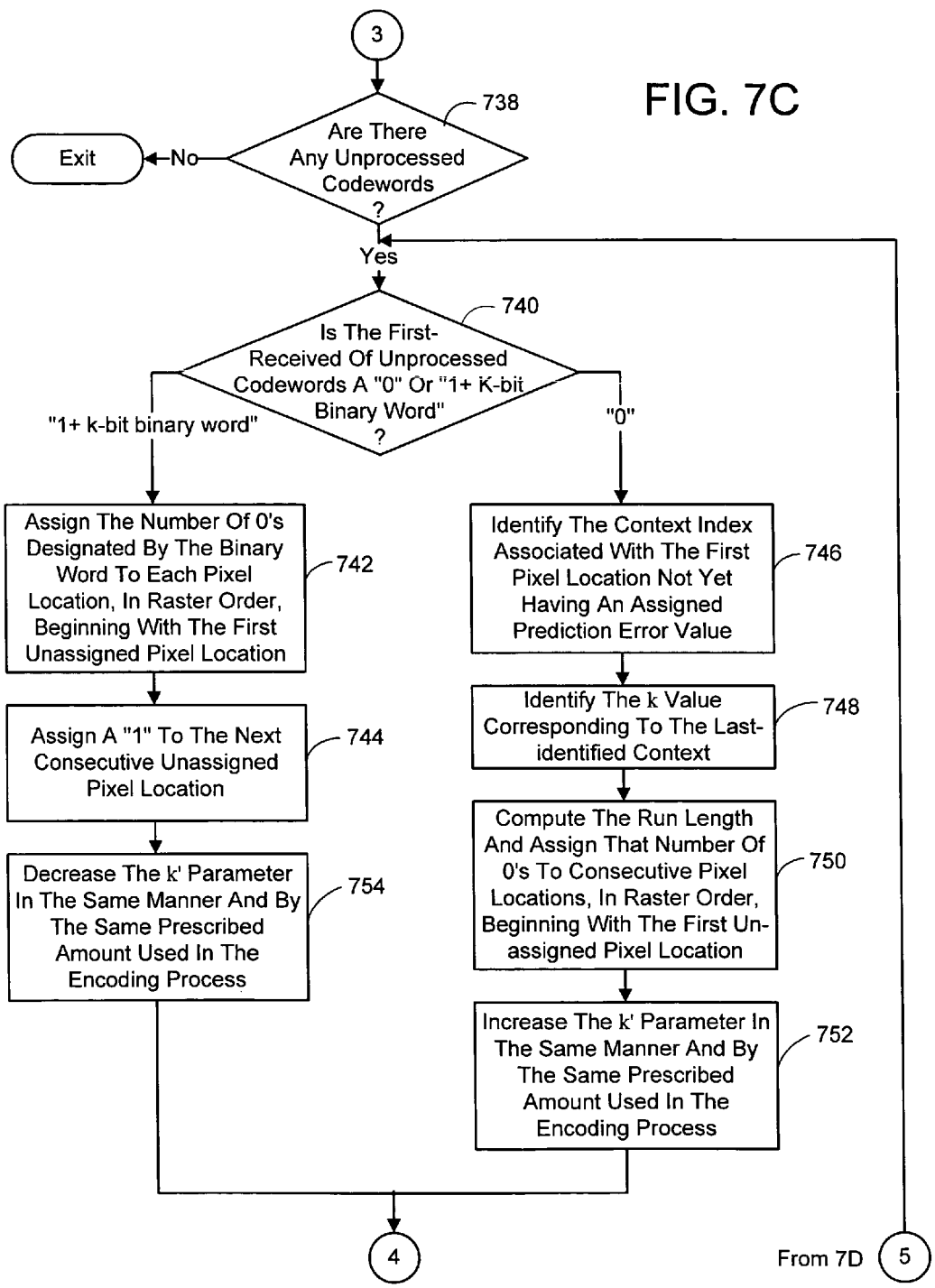
Figure 7D:
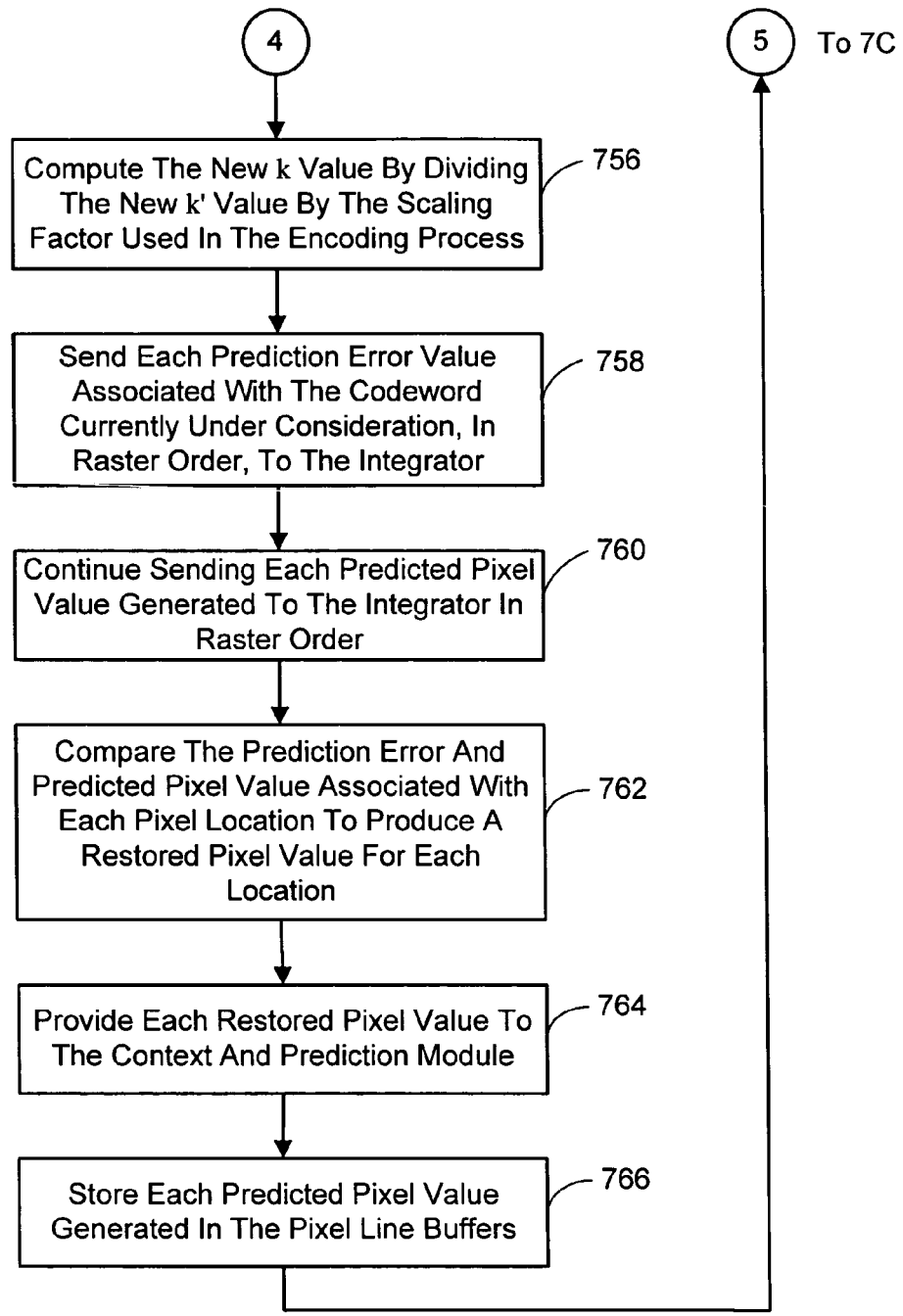

Referring to FIGS. 5A–C, the aforementioned context-dependent, backward adaptive, RLR encoding technique specifically involves first creating the aforementioned encoding table (process action 500). Then, the k value associated with each context index c in the table is set to a prescribed initial value (e.g., k=2), as indicated by process action 502. In addition, a scaled version of the k variable designated as the Rice parameter k' is assigned to each context (process action 504). For example, a simple scaling factor could be multiplied by the current k value to produce the current k' value, which would be greater than the k value. The foregoing initialization is characterized by the following instruction: Set $k(c)=k_0$ and $k'(c)=G k_0$, for c=0, 1, . . . , $2^L-1$. The scaling parameter G controls the speed of adaptation, and it is typically set to a value of G=16. It allows k to be incremented and decremented effectively by fractional amounts (i.e., by adapting k' by integer amounts but scaling those down by G). In other words, the advantage of creating the k' variable is that k' can be varied by integer amounts to prevent any round off errors between the encoder and decoder, while at the same time, k is varied by fractional amounts to ensure precision in the process. It is noted that since the k variable can be easily derived from the k' variable, if desired only the k' variables could be stored in the encoding table. This would reduce the memory requirements somewhat. For the purposes of this description, whenever it is stated that the k variable is read from the table, it will be assumed the variable is computed from the stored value of the k' variable when only this latter variable is stored in the encoding table. It is noted that it would be possible to predict the pixel values and prediction errors for all the pixel locations in the bi-level imaged being encoded, and then employ the present RLR encoding technique. However, this would required more memory space than is necessary. Thus, while such an approach could be followed, it is preferred that the encoding process be performed in an on-going basis as the pixel value and prediction error is computed for each pixel location in the image. Accordingly, as previously-unselected prediction error values are generated, each is selected in raster order. Particularly, this involves initially selecting the first prediction error value generated, or if a codeword has been previously produced, the first prediction error value generated since the last codeword was created (process action 506).

The present RLR coder then identifies the context index associated with the pixel location of the selected prediction error value as determined in the prediction error determination process described earlier (process action 508). The k value currently assigned to that context index (i.e., k(c)) is then read from the encoding table (process action 510). The associated k value read from the table is used to calculate the run length (process action 512), where the run length is preferably equal to $2^k$. This run length represents the number of consecutive white pixels in raster order that must exist in order to generate a "0" codeword. It is then determined whether there is a previously-unselected prediction error value that has been generated (process action 514). If not, the process ends. However, if an unselected prediction error value remains, the first-generated of the previously-unselected prediction error values is selected (process action 516). It is then determined whether the selected prediction error value it is a 1 or a 0 (process action 518). If it is a 0, then it is determined if this value is in the "middle" of the previously computed run length under consideration or whether it represents the end of this run length (process action 520). If the prediction error value represents the end of a run, then a "0" codeword is output (process action 522). Of course in order to know whether an prediction error value represents the end of the current run length, the present RLR coder must keep track of how many 0s have been encountered. This is preferably done by also including run counters in the encoding table. Specifically, a separate run counter would be assigned to each context index. In one embodiment the run counter would initially be set to the computed run length value. Then, each time a 0 is encountered as discussed above, including the first in the series, the counter is decremented by one. When the counter reaches zero, the prediction error value currently being process is deemed to be the end of the current run length. If the selected prediction error value does not represent the end of a run, no codeword is generated. If, on the other hand, a prediction error value of "1" is encounter, then the present RLR coder generates a "1+k-bit binary word" code (process action 524) where the k-bit binary word represents the number of "0's" encountered in the current run prior to encountering the "1". The number of "0's" encountered can be easily determined using the aforementioned run counter assigned to the context index associated with the pixel location where the run began. In the case where no codeword is generated, it is again determined whether there are any previously unselected prediction error values remaining (process action 514). If not, the process ends. On the other hand, if unselected values remain, as before the next value is selected in the order in which they were generated (process action 516). Process actions 518 through 524 are then repeated, as appropriate.

In addition, every time a code word is generated, regardless of whether it was a "0" of a "1+k-bit binary word", the k-value associated with the run that resulted in the code word is adjusted. This is preferably accomplished as follows. Referring to FIG. 5B, if the codeword generated was a "0", then the parameter k' is increased by a prescribed amount (process action 526). Conversely, if the codeword was not a "0", then the parameter k' is decreased by a prescribed amount (process action 528). Specifically, the scaled Rice parameter k'(c) is adjusted by $$k'(c) \leftarrow \begin{cases} k'(c) + Up(k), & \text{if } s = 0 \\ k'(c) - Dn(k), & \text{if } s \neq 0 \end{cases} \quad (2)$$

where s is the codeword and the parameters Up(k) and Dn(k) control the speed of adaptation. In tested embodiments of the present invention, Up(k) and Dn(k) were set by Up(0 . . . 4)=[3 3 4 5 6], Up(k)=8, for k≧5, and Dn(0 . . . 5)=[0 3 6 6 8 10], Dn(k)=12, for k≧6, assuming G=16.

Referring now to FIG. 5C, the new k value is then computed by dividing the new k' value by the aforementioned scaling factor G (process action 530). Specifically, k(c) is set equal to floor [k'(c)/G]. By setting G equal to $2^g$, that is equivalent to k(c)=k'(c)>>g, where >> denotes a right shift operator. The new values for k and k' are then stored in the encoding table in place of the previous values (process action 532). The set of exemplary parameters for G, Up(.) and Dn(.) described above have shown to provide a very good performance, for a wide variety of bi-level images.

In addition, when a codeword has been generated, it is determined whether there are any unselected prediction error values remaining (process action 534). If not, the process ends. However, when there are remaining unselected values, the next prediction error value in the order of their generation is selected (process action 506), and the foregoing process is repeated for a new "run" by repeating process action 508 through 534, as appropriate.

3.0 Decoding

Figure 6:
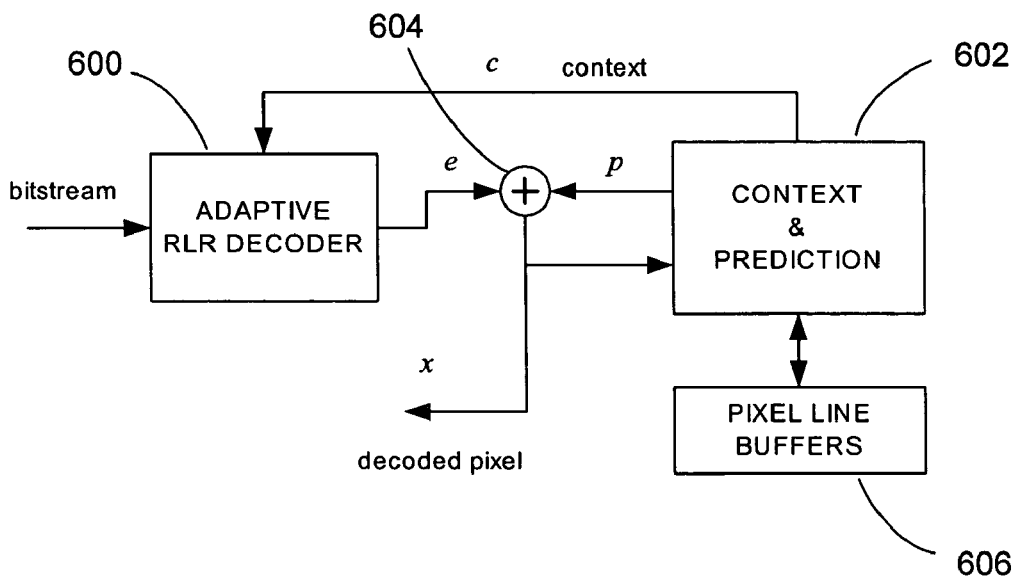
FIG. 6 is a simplified block diagram of the modules for implementing the decoding process of FIG. 2B, which include an entropy decoder followed by an integrator that reconstructs the pixels from the decoded prediction errors and predicted pixel values generated by a context-based prediction module.

The system and process for decoding a bi-level image encoded as described above is for the most part just the reverse of the coding process. A simplified block diagram of the present BLC decoder is shown in FIG. 6. Essentially, the decoder has an adaptive RLR decoder module 600 that inputs the encoded bi-level image data bitstream produced by the previously described BLC encoder. In addition, the decoder includes a context and prediction module 602 that is identical to the one employed in the BLC encoder. In a manner that will be described below, the context and prediction module 602 provides a context index c to the adaptive RLR decoder module 600. Using the incoming bitstream (which consists of codewords generated by the encoder) and the context information generated by the decoder, the decoder reconstructs the prediction error values e and outputs them one at a time to an integrator module 604. At the same time the context and prediction module 602 generates predicted bi-level image pixel values p in a way that mirrors the process previously performed by the context and prediction module of the BLC encoder. These predicted values p are supplied as they are generated to the integrator 604. The integrator takes the prediction error value e and predicted pixel value p corresponding to each pixel position of the bi-level image being reconstructed, in raster order, and compares them via an exclusive OR process. The result of this comparison is designated as the restored value x for the bi-level image pixel location then under consideration. This procedure is repeated for each pixel location until the entire image has been restored. It is noted that the restored value x is also fed back into the context and prediction module 602 for use in generating subsequent predicted pixel values p. The predicted values p generated by the context and prediction module 602 are provided to and stored in the pixel line buffers 606. The transfer of data between the context and prediction module 602 and the pixel line buffers 606 is two-way, as indicated by the double headed arrow linking the two modules. This is because the context and prediction module 602 also accesses the prediction values p to input values of pixels from previous raster lines and from pixels preceding the pixel under consideration in the same raster line. These prediction values p are used to predict the value of the pixel under consideration in the same manner as the encoding process, as will be seen shortly.

Having identified the general modules that make up the present BLC decoder, the process by which they are employed will now be described. Essentially, the decoding process first involves receiving the bitstream generated by the encoder and processing it using what will be referred to as a context-dependent, backward-adaptive, Run-Length-Rice (RLR) decoding technique. The present RLR decoder processes each codeword in the incoming bitstream in the order of its arrival. Specifically, referring to FIGS. 7A–D, it is determined whether the incoming codeword is of the "0" or "1+k-bit binary word" form (process action 700). If the received codeword is of the "1+k-bit binary word" form, in process action 702 the decoder assigns the designated number of 0's to each consecutive pixel location, in raster order, beginning with the first pixel location (e.g., the upper left hand corner pixel location). It then assigns a "1" to the next consecutive pixel location (process action 704). However, if a "0" codeword is received, the decoder would assign $2^k$ number of 0's, each to respective consecutive pixel locations of the image, in raster order, again beginning with the first pixel location. Of course, while the number of 0s designated by the binary word is straight forward, the decoder must know what the value of k in order to designate the correct number of 0s when a "0" codeword is received. Essentially, to accomplish this task it is first recognized that the prediction error value of the first pixel location will always be a 0 as a result of the encoding process. Thus, the decoder assigns a 0 to that location and sends the value to an integrator (process action 706). At the same time, the decoder starts the same pixel prediction process as was used by the encoder. Specifically, as the predicted value of the first pixel location will always be white (e.g., e.g., a 0), the decoder predicts this pixel to be a 0 and sends it to the integrator as well (process action 708). The integrator is simply an exclusive OR process, and so in the case of the first prediction error and predicted pixel values, the integrator will always produce a 0 or white pixel for the first pixel position in the recovered bi-level image (process action 710).

In association with generating the first predicted pixel value, the decoder also identifies the context associated with the pixel location (process action 712). In the case of the first pixel location this context will be all 0's and so the context index would also be a 0. The RLR decoder constructs a decoding table that matches the previously discussed encoding table (process action 714). Namely, an initial k value (if included) is assigned to each possible context index, as is a k' value and a run counter value. These initial values are by design the same as those used to construct the encoding table. The decoder takes the context index provided to it as a result of the pixel prediction process and uses this to identify the appropriate k value (process action 716). Thus, if the codeword under consideration is a "0", the decoder can now identify its associated run length preferably using the equation $2^k$ (process action 718). The decoder then assigns 0's to the appropriate number of consecutive, previously unassigned pixel locations (process action 720). In the case of the first pixel location, if the first code word is a "0", a number of consecutive pixel locations based on the initial value of k, and starting with the first location, would be assigned a 0. In addition, the k value associated with the context index of the pixel location at the beginning of the run length is adjusted just as it was in the encoding process. Specifically, if the codeword under consideration is a "0", the k' parameter is increased in the same manner and by the same prescribed amount used in the encoding process (process action 722). Conversely, if the codeword was a of the "1+k-bit binary word" type, the k' parameter is decreased in the same manner and by the same prescribed amount employed in the encoding process (process action 724). Finally, the new k' value is divided by the scaling factor used in the encoding process to compute the new k value (process action 726). Thus, the decoding table will always match the encoding table as it existed when the codeword currently being processed was generated. The prediction error values generated in the above manner are fed into the integrator in raster sequence (process action 728), which is also receiving the corresponding predicted pixel values for the associated pixel location that continue to be generated using the same method as was used to generated them in the encoding process (process action 730). The integrator compares each pair of prediction error and predicted pixel values and outputs a value representing the restored pixel value for the corresponding pixel location in the restored bi-level image (process action 732). Specifically, for the pair of corresponding prediction error and predicted pixel values, if the prediction error value is a 0 and the predicted pixel value is a 0, then the result is a 0, which is designated as the restored pixel value and assigned to the pixel location under consideration. Likewise, if the prediction error value is a 0 and the predicted pixel value is a 1, a 1 is generated and assigned to the pixel location. If, however, the recovered prediction error is a 1, the predicted pixel value, regardless of its value, is flipped such that a 0 is changed to a 1 and 1 is changed to a 0. The flipped value is then designated as the restored pixel value of the pixel location under consideration. Each restored pixel value is also fed back into the context and prediction module as described previously (process action 734), and the module stores each predicted value generated in the pixel line buffers (process action 736) to continue the prediction process in the same manner as occurred in the encoder when the bi-level image being restored was encoded.

Once the first incoming codeword has been processed as above, the decoder determines if any unprocessed codewords have been received (process action 738). If not, the process ends. However, if unprocessed codewords do exist, the decoder retrieves the earliest unprocessed codeword and processes it in the same way, except that the context employed is that associated with the next consecutive un-reconstructed pixel location in the bi-level image being generated (which corresponds to the next un-assigned pixel in the so-called prediction error image being generated by the decoder). This is repeated over and over until the entire image has been reconstructed. Specifically, it is determined whether the first received, and of the as of yet unprocessed, codeword is a "0" codeword or of the "1+k-bit binary word" form (process action 740). If the received codeword is of the "1+k-bit binary word" form, the decoder assigns the designated number of 0's to each consecutive pixel location of a prediction error "image", in raster order, beginning with the first un-assigned pixel in raster order in the prediction error image (process action 742). It then assigns a "1" to the next consecutive pixel location (process action 744). However, if a "0" codeword is received, the decoder identifies the context index associated with the first pixel location in the prediction error "image" not yet having an assigned prediction error value (process action 746). The decoder uses this context index to identify the appropriate k value from the aforementioned table (process action 748). The decoder then computes the run length (preferably using $2^k$ as the basis) and assigns that number of 0's to consecutive pixel locations of the image, in raster order, beginning with the first un-assigned pixel in the prediction error image (process action 750). In addition, the k value associated with the context index of the pixel location at the beginning of the run length is adjusted just as it was in the encoding process. Specifically, if the codeword under consideration is a "0", the k' parameter is increased in the same manner and by the same prescribed amount used in the encoding process (process action 752). Conversely, if the codeword was of the "1+k-bit binary word" type, the k' parameter is decreased in the same manner and by the same a prescribed amount employed in the encoding process (process action 754). And finally, the new k' value is divided by the scaling factor used in the encoding process to compute the new k value (process action 756).

The decoder then sends the computed prediction error values associated with the codeword currently under consideration, in raster order, to the integrator (process action 758). At the same time, the decoder continues the pixel prediction process, and sends each predicted pixel value in raster order to the integrator (process action 760). The integrator compares each pair of corresponding prediction error and predicted pixel values, and designates the resulting value as the restored pixel value for the corresponding pixel location in the restored bi-level image (process action 762). As before, the just-assigned restored pixel value is also fed back into the context and prediction module (process action 764) and the module stores the last-assigned predicted value in the pixel line buffers to assist in generating subsequent predicted pixel values (process action 766). It is then determined once again whether any unprocessed codewords have been received (process action 738). If not, the decoding process ends. However, if there are more codewords, the process of actions 740 through 766 is repeated as appropriate until they are all processed.

4.0 BLC Performance

The present BLC was designed for simplicity, with quick adaptation rules that allow it to track rapidly varying statistics in the image to be encoded. It is easy to see from the previous sections that an implementation of the present BLC leads to a relatively short program. A natural question that arose was then: how much compression performance hit would the present BLC have when compared to modern bi-level coders such as JBIG or JBIG 2?

Figure 9:
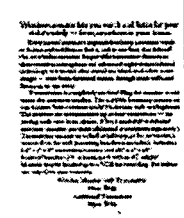
FIG. 9 is a table showing the compression performance of several bi-level lossless coders including that of the present invention on a set of mask images.
Figure 9:
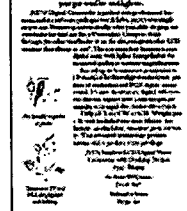
Figure 9:

FIG. 8 is a table showing the encoded file size for a popular set of 200 dpi CCITT fax test images. Low-resolution versions of those images are also shown in the table of FIG. 8, to help the reader familiar with that data set. FIG. 9 is a table showing the results for a set of bi-level images corresponding to masks generated from a segmentation algorithm that classifies pixels as text or background, for composite document processing. It is noted that for the CCITT test images, the performance of BLC is only about 3% worse than JBIG, and about 11% worse than JBIG 2 (with QM encoding and no special content flag set). For the mask images, BLC essentially matches the performance of JBIG, which is about 7% worse than JBIG 2. For the CCITT set, the JB 2 codec in DjVu [4] is about 15% better than JBIG 2, but its performance drops with the more "salt-and-pepper" masked images.

While the invention has been described in detail by specific reference to preferred embodiments thereof, it is understood that variations and modifications thereof may be made without departing from the true spirit and scope of the invention. For example, the performance of present BLC can be improved by enhancing the prediction step. For example, by searching for more complex template matches such as character-based pattern matches [9], which can be quite efficient if the input image is know to contain text. However, in generic applications where the image content is unknown, the BLC as described here may be a good choice for a robust bi-level codec with no parameters to be adjusted.

REFERENCES

1) G. G. Langdon, Jr. and Jorma Rissanen, "Compression of black-white images with arithmetic coding," *IEEE Trans. on Communications*, vol.COM-29, pp. 858–867, June 1981.
2) W. B. Pennebaker and J. L. Mitchell, *JPEG: Still Image Data Compression Standard*. New York: Van Nostrand Reinhold, 1993, Chapter 9.
3) P. G. Howard, "Lossless and lossy compression of text images by soft pattern matching," *Proc. IEEE Data Compression Conf.*, Snowbird, Utah, pp. 210–219, March 1996.
4) P. Haffner, L. Bottou, P. G. Howard, P. Simard, Y. Bengio, and Y. Le Cun, "Browsing through high quality document images with DjVu," *Proc. IEEE International Forum on Research and Tech. Advances in Digital Libraries*, Santa Barbara, Calif., pp. 309–318, April 1998. See also the DjVu software at: http://www.lizardtech.com/products/djvu.html.
5) G. G. Langdon, Jr., "An adaptive run-length encoding algorithm," *IBM Tech. Discl. Bull.*, vol. 26, pp. 3783–3785, December 1983.
6) K. Nguyen-Phi and H. Weinrichter, "A new binary source coder and its application in bi-level image compression," *Proc. IEEE Global Telecommunications Conf. (GLOBECOM)*, Westminster, London, pp. 1483–1487, November 1996.
7) E. Ordentlich, M. Weinberger, and G. Seroussi, "A low-complexity modeling approach for embedded coding of wavelet coefficients," *Proc. IEEE Data Compression Conf.*, Snowbird, Utah, pp. 408–417, March 1998.
8) F. Ono, S. Kino, M. Yoshida, and T. Kimura, "Bi-level image coding with Melcode—comparison of block type code and arithmetic type code," *Proc. IEEE Global Telecommunications Conf. (GLOBECOM)*, Dallas, Tex., pp.255–260, November 1989.
9) R. N. Ascher and G. Nagy, "A means for achieving a high degree of compaction on scan-digitized printed text," *IEEE Transactions on Computers*, vol. C-23, pp. 1174–1179, November 1974.

What is claimed is:

1. A process for encoding bi-level images, said process comprising:
   for each pixel location in raster order in the bi-level image,
   a predicting step for predicting a binary value for the pixel at a pixel location under consideration based on its context, wherein a context of a pixel refers to predicted values of a prescribed pattern of pixels preceding the pixel in raster order, said predicting step comprising,
     an assigning step for assigning a prescribed initial probability value to each of a set of potential context indexes, wherein a context index is a binary word comprising previously predicted binary values of a prescribed pattern of pixels of the bi-level image preceding in raster order a pixel whose value is currently being predicted, and wherein the initial probability value indicates the probability that the pixel whose value is currently being predicted has a first binary value associated with a first of the two colors of the bi-level image based on the predicted values of the prescribed pattern of pixels preceding the pixel being predicted, and
   for each pixel location in raster order in the bi-level image,
     a computing step for computing the context index associated with the prescribed pattern of pixels preceding the pixel location under consideration, wherein pixel locations in the pattern that fall outside the bi-level image are considered to have the first binary value,
     an identifying step for identifying the probability value assigned to the computed context index,
     whenever the identified probability value indicates that the pixel location under consideration is more likely than not to have the first binary value, a second assigning step for assigning as the predicted pixel value for that location the first binary value, and
     whenever the identified probability value indicates that the pixel location under consideration is not more likely than not to have the first binary value, a third assigning step for assigning as the predicted pixel value for that location the second binary value associated with a second of the two colors of the bi-level image, and
   a determining step for determining whether the predicted pixel value matches the actual pixel value for the pixel location under consideration; and
   a compressing step for compressing the data concerning at which pixel locations the predicted pixel values match and do not match the actual values using a context-dependent, backward adaptive, Run-Length-Rice encoding technique.

2. The process of claim 1, wherein the first assigning step for assigning a prescribed initial probability value to each of a set of potential context indexes, comprises assigning the same initial probability value to each context index, said initial probability being a number indicative of a 0.50 probability that the pixel value has the first binary value.

3. The process of claim 1, further comprising an adjusting step for adjusting the probability value assigned to the computed context index by increasing it by a prescribed amount if the predicted pixel value of the pixel location under consideration is assigned the first binary value and decreasing it by a prescribed amount if the predicted pixel value is assigned the second binary value.

4. The process of claim 3, wherein the probability values are scaled so as to range between 0 and prescribed maximum integer number, and wherein the adjusting step comprises making the adjustments in integer increments.

5. The process of claim 4, wherein the adjusting step further comprises:
whenever decreasing the scaled probability value would result in a value of less than 0, making the probability value 0; and
whenever increasing the scaled probability value would result in a value of greater than the prescribed maximum minus one, making the probability value equal to the prescribed maximum minus one.

6. A process for encoding bi-level images, comprising:
for each pixel location in raster order in the bi-level image,
a predicting step for predicting a binary value for the pixel at a pixel location under consideration based on its context, wherein a context of a pixel refers to predicted values of a prescribed pattern of pixels preceding the pixel in raster order, and
a determining step for determining whether the predicted pixel value matches the actual pixel value for the pixel location under consideration; and
a compressing step for compressing the data concerning at which pixel locations the predicted pixel values match and do not match the actual values using a context-dependent, backward adaptive, Run-Length-Rice encoding technique, wherein said compressing step comprises,
an assigning step for assigning a prescribed initial k value to each context index, wherein a k value is used to compute a number representing a string of consecutive, raster ordered, prediction error values having the first binary value,
an identifying step for identifying the k value assigned to the context index computed for the first pixel location in the bi-level image and subsequently for each pixel location that follows in raster order a pixel that triggered a codeword to be established, and
for each pixel location in the bi-level image beginning with the first and proceeding in raster order,
a second determining step for determining if the prediction error value assigned to the pixel location under consideration has the first or second binary value,
whenever the prediction error value assigned to the pixel location under consideration has the first value, steps for taking no action unless the number of preceding pixels locations for which no action has been taken equals the last-identified k value and if it does equal this k value establishing a first type of codeword by representing the number of preceding pixel locations for which no action has been taken with a single first value, and
whenever the prediction error value assigned to the pixel location under consideration has the second value, an establishing step for establishing a second type of codeword by representing the prediction error having the second value and the number of preceding pixel locations for which no action has been taken with a second value and a binary word indicating the number of preceding pixel locations for which no action has been taken.

7. The process of claim 6, further comprising a computing step for computing the number representing the string of consecutive, raster ordered, prediction error values having the first binary value from an assigned k value using the equation $2^k$.

8. The process of claim 6, wherein the first assigning step comprises assigning the same initial k value to each context index, said initial k value being two.

9. The process of claim 6, further comprising, whenever a codeword is established, an adjusting step for adjusting the k value assigned to the context index associated with pixel location that begins the string of prediction error values represented by that codeword by increasing it by a prescribed amount if the codeword is of the first type and decreasing it by a prescribed amount if the codeword is of the second type.

10. The process of claim 9, wherein the k values are scaled by multiplying each by a prescribed scaling factor.

11. The process of claim 10, wherein the prescribed amount that the scaled k values are increased or decreased depends on how many times the k values has been adjusted from its initial value.

12. The process of claim 11, wherein the prescribed scaling factor equals 16, the prescribed amount that a k value is increased is 3, 3, 4, 5, and 6 for the first through fifth times it is consecutively increased, respectively, and 8 for each time it is consecutively increased after the fifth time.

13. The process of claim 11, the prescribed amount that a k value is decreased is 0, 3, 6, 6, 8 and 10 for the first through sixth times it is consecutively decreased, respectively, and 12 for each time it is consecutively decreased after the sixth time.

14. A process for decoding a bi-level image encoded by a process that reduces the image data to a series of codewords from which can be derived prediction error values indicating whether the pixel values of each pixel location in the bi-level image had a first binary value or a second binary value, said codewords coming in two types a first of which is a first value representing a number of pixel locations that have a first binary prediction error value and the second of which comprises a second value followed by a binary word that indicates the number of pixel locations preceding a location having a second binary prediction error value that exhibit the first binary prediction error value, said process comprising:
a receiving step for receiving the series of codewords;
for each pixel location in raster order in a restoration image of the encoded bi-level image;
a predicting step for predicting a binary value for the pixel at the pixel location under consideration based on its context, wherein a context of a pixel refers to predicted values of a prescribed pattern of pixels preceding the pixel in raster order, and
a deriving step for deriving a prediction error value for the pixel location under consideration from a received codeword;
a comparing step for comparing in raster order the prediction error assigned to a pixel location of the restoration image and the predicted pixel value for that location using an exclusive OR process such that whenever the prediction error value is the first binary value the corresponding predicted pixel value is not changed, and whenever the prediction error value is the second binary value the corresponding predicted pixel value is flipped to its opposite binary value; and a designating step for designating the result of each prediction error and predicted pixel value comparison as a restored pixel value for the associated pixel location in the restoration image.

15. The process of claim 14, wherein the predicting step comprises:

an assigning step for assigning a prescribed initial probability value to each of a set of potential context indexes which is identical to those used in encoding the bi-level image, wherein a context index is a binary word comprising previously predicted binary values of a prescribed pattern of pixels of the bi-level image preceding in raster order a pixel whose value is currently being predicted, and wherein the initial probability value indicates the probability that the pixel whose value is currently being predicted has a first binary value associated with a first of the two colors of a restoration image of the encoded bi-level image based on the predicted values of the prescribed pattern of pixels preceding the pixel being predicted; and for each pixel location in raster order in the restoration image of the encoded bi-level image upon receiving the first of the series of codewords, a computing step for computing the context index associated with the prescribed pattern of pixels preceding the pixel location under consideration, wherein pixel locations in the pattern that fall outside the bi-level image are considered to have the first binary value, an identifying step for identifying the probability value assigned to the computed context index, whenever the identified probability value indicates that the pixel location under consideration is more likely than not to have the first binary value, a second assigning step for assigning as the predicted pixel value for that location the first binary value, and whenever the identified probability value indicates that the pixel location under consideration is not more likely than not to have the first binary value, a third assigning step for assigning as the predicted pixel value for that location the second binary value associated with a second of the two colors of the bi-level image.

16. The process of claim 15, further comprising an adjusting step for adjusting the probability value assigned to the computed context index by increasing it by the prescribed amount used in encoding the bi-level image if the predicted pixel value of the pixel location under consideration is assigned the first binary value and decreasing it by the prescribed amount used in encoding the bi-level image if the predicted pixel value is assigned the second binary value.

17. The process of claim 16, wherein the probability values are scaled so as to range between 0 and a prescribed maximum integer number identical to that used in the encoding of the bi-level image, and wherein the adjusting step comprises:

making the adjustments in integer increments;

making the probability value 0, whenever decreasing the scaled probability value would result in a value of less than 0; and making the probability value equal to the prescribed maximum minus one, whenever increasing the scaled probability value would result in a value of greater than the prescribed maximum minus one.

18. The process of claim 14, wherein the deriving step comprises:

an assigning step for assigning a prescribed initial k value to each context index that is identical to the value used in encoding the bi-level image, wherein a k value is used to compute a number representing a string of consecutive, raster ordered, prediction error values having the first binary value in the same manner employed in encoding the bi-level image being decoded;

a determining step for determining if the last-received codeword is of the first or second type;

whenever the last-received codeword is of the second type, a second assigning step for assigning prediction error values having the first binary value to the number of previously-unassigned pixel locations in a restoration of the encoded bi-level image in raster order starting with the earliest non-assigned location that are indicated by the binary word component of the codeword and assigning a prediction error value having the second binary value to the pixel location following those newly assigned pixel locations; and whenever the last-received codeword is of the first type, an identifying step for identifying the k value assigned to the context index associated with the earliest pixel location in the restoration image not yet assigned a prediction error value, and a third assigning step for assigning prediction error values having the first binary value to the number of previously-unassigned pixel locations that are indicated by the identified k value in the restoration image in raster order starting with the earliest non-assigned location.

19. The process of claim 18, further comprising, upon completion of assigning prediction error values in connection with the processing of the last-received codeword, an adjusting step for adjusting the k value assigned to the context index associated with pixel location that begins the string of prediction error values just assigned by increasing the k value by a prescribed amount employed in the encoding of the bi-level image being decoded if the codeword is of the first type and decreasing the k value by a prescribed amount employed in the encoding of the bi-level image being decoded if the codeword is of the second type.

20. The process of claim 19, wherein the k values are scaled by multiplying each by a prescribed scaling factor employed in the encoding of the bi-level image being decoded.

* * * * *

UNITED STATES PATENT AND TRADEMARK OFFICE
CERTIFICATE OF CORRECTION

PATENT NO. : 6,990,242 B2  Page 1 of 1
APPLICATION NO. : 10/988089
DATED : January 24, 2006
INVENTOR(S) : Malvar It is certified that error appears in the above-identified patent and that said Letters Patent is hereby corrected as shown below:

In column 1, line 9–10, delete "Ser. No.09/815,943" and insert -- Ser. No. 09/815,943 --, therefor.

In column 11, line 41, delete "e(c)=x⊕p(c)" and insert -- e(c)≡x⊕p(c) --, therefor.

In column 13, line 33, delete "1092(N)" and insert -- $\log_2(N)$ --, therefor.

In column 18, line 61, after "e.g.," delete "e.g.,".

Signed and Sealed this

Twenty-third Day of March, 2010

David J. Kappos
*Director of the United States Patent and Trademark Office*